(12) United States Patent
Fabian et al.

(10) Patent No.: US 12,481,823 B2
(45) Date of Patent: Nov. 25, 2025

(54) PREDICATE-GUIDED PREPARATION FOR LLM INTEGRATIONS IN SPREADSHEET ENVIRONMENTS

(71) Applicant: Microsoft Technology Licensing, LLC, Redmond, WA (US)

(72) Inventors: Daniel Fabian, Wabern (CH); Rasika Mudumbai Chakravarthy, Redmond, WA (US); Carina Suzana Negreanu, Cambridge (GB); John Herbert Martin Williams, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 235 days.

(21) Appl. No.: 18/314,662

(22) Filed: May 9, 2023

(65) Prior Publication Data

US 2024/0303421 A1    Sep. 12, 2024

Related U.S. Application Data

(60) Provisional application No. 63/489,674, filed on Mar. 10, 2023.

(51) Int. Cl.
  *G06F 40/18*    (2020.01)
  *G06F 40/205*    (2020.01)
  (Continued)

(52) U.S. Cl.
  CPC ............ *G06F 40/18* (2020.01); *G06F 40/205* (2020.01); *G06F 40/284* (2020.01); *G06F 40/40* (2020.01)

(58) Field of Classification Search
  None
  See application file for complete search history.

(56) References Cited

U.S. PATENT DOCUMENTS 8,239,751 B1 *  8/2012  Rochelle .............. G06F 40/247
                                                      715/212
11,989,507 B2 *  5/2024  Tunstall-Pedoe ....... G06F 40/20
                         (Continued)

OTHER PUBLICATIONS

Wachtel et al. "Initial implementation of natural language turn-based dialog system". 7th International Conference in Intelligent Human Computer Interaction, IHCI 2015, Procedia Computer Science 84 (2016), 49-56 (Year: 2016).*

(Continued)

*Primary Examiner* — Jesse S Pullias

(57) ABSTRACT

Technology is disclosed herein for the integration of spreadsheet environments and LLM services. In an implementation, an application receives a natural language input from a user associated with a spreadsheet. The application generates a prompt based on the user input and at least a portion of the spreadsheet. The prompt includes a statement of the problem, a request for an LLM service to identify preparatory steps before generating a solution to the problem, and a request to include the preparatory steps in output that includes the solution to problem. The application service receives a reply to the prompt from the LLM service that includes the output. The application service implements the preparatory steps with respect to data in the spreadsheet and implements the solution to the problem with respect to the data in the spreadsheet.

20 Claims, 25 Drawing Sheets

(51) Int. Cl.
  *G06F 40/284* (2020.01)
  *G06F 40/40* (2020.01)

(56) References Cited

U.S. PATENT DOCUMENTS

2004/0133567 A1* 7/2004 Witkowski ............ G06F 16/283
2024/0249081 A1* 7/2024 UzZaman ............... G06F 40/40

OTHER PUBLICATIONS

Williams, Kelly L. "Using ChatGPT with Excel". Journal of Accountancy, https://www.journalofaccountancy.com/news/2023/jan/using-chatgpt-with-excel.html, Jan. 30, 2023 (Year: 2023).*
Ragavan et al. "GridBook: Natural Language Formulas for the Spreadsheet Grid". IUI '22, Mar. 22-25, 2022, Helsinki, Finland (Year: 2022).*
Gulwani et al. "NLyze: Interactive Programming by Natural Language for Spreadsheet Data Analysis and Manipulation". SIGMOD'14, Jun. 22-27, 2014, Snowbird, UT, USA. (Year: 2014).*
Liu et al. "Lang2LTL: Translating Natural Language Commands to Temporal Specification with Large Language Models". 6th Conference on Robot Learning (CoRL 2022), Auckland, New Zealand (Year: 2022).*
Anonymous: "Holy Google Sheets! You Can Now Integrate the ChatGPT APIH", accessed on link https://ai.plainenglish.io/holy-google-sheets-you-can-now-integrate-the-chatgptapi-b401ac065844, Published on Mar. 8, 2023, retrieved on May 3, 2024, 7 pages.
Gislason, et al., "Generative AI and spreadsheets", accessed on https://medium.grid.is/gpt-3-and-spreadsheets-4808acfda30d, Feb. 8, 2023, retrieved on May 3, 2024, 7 pages.
Gislason, Hjalmar, "Launching GRID 2.0: the magical surface for numbers", Retrieved from the URL: https://grid.is/blog/launching-grid-2-0-the-magical-surface-for-numbers, Feb. 14, 2023, 3 Pages.
International Search Report and Written Opinion received for PCT Application No. PCT/US2024/018448, dated Jun. 6, 2024, 16 pages.
Kogan, Daniel, "ChatGPT and Excel: Excelhero", Retrieved from the URL: https://web.archive.org/web/20230306105400/https://excelhero.de/ki/chatgpt-und-excel/, Mar. 6, 2023, 15 Pages.
Mcnutt, et al., "On the Design of AI-powered Code Assistants for Notebooks", arXiv2301.11178, Jan. 26, 2023, 18 pages.
Sarkar, et al., "What is it like to program with artificial intelligence?," In Repository of arXiv:2208.06213v1, Aug. 12, 2022, 26 Pages.
International Preliminary Report on Patentability received for PCT Application No. PCT/US2024/018448, mailed on Sep. 18, 2025, 9 pages.

* cited by examiner

| | A | B | C | D | E | F | G | H | I | J |
|---|---|---|---|---|---|---|---|---|---|---|
| | MY SPREADSHEET DATA | | | | | | | | | |
| 1 | Employee Name | Address | City | State | Job Title | Salary | Yr hired | | | |
| 2 | Abi, James | 510 Coolidge Rd | Harborview | CT | Developer | 160k | 2022 | | | |
| 3 | Akheem, Raj | 110 S Maryville St | Monroe | NM | Developer | 145k | 2017 | | | |
| 4 | Anders, Wilma | 33200 High St #100 | Corbin | DE | Sys Arch | 132k | 2018 | | | |
| 5 | Allen, Darren | 1690 Ten Mile Rd | Mapleton | NJ | Manager | 145k | | TASK PANE | | |
| 6 | Azul, Amy | 1240 Wallford Ct | Edwards | MD | Marketing | 172k | | | | |
| 7 | Baker, Devin | 3303 W Evergreen Pl | Monroe | NM | HR Director | 145k | | | | |
| 8 | Benson, Charles | 648 Smythe St SW | Montrose | CO | Sys Arch | 164k | | | | |
| 9 | Beck, Thomas | 92 Captain Lane | Carbondale | AZ | Developer | 124k | | | | |
| 10 | Biggins, Margo | 67441 Lookout Mtn Dr | Mapleton | NJ | Sys Arch | 164k | | | | |
| 11 | Bishop, Sonny | 31721 Commerce Ave | Harborview | CT | Developer | 132k | | What is this data about? | | |
| 12 | Bork, Phillip | PO Box 5171 | Corbin | DE | Sys Admin | 123k | | | | |
| 13 | Cady, Diane | 1066 S Green Blvd | Edwards | MD | Sr Developer | 152k | | | 503 | |
| 14 | | | | | | | | | | |
| 15 | | 502 | | | | | | | | |
| 16 | | | | | | | | | | |
| 17 | | | | | | | | | | |

MY SPREADSHEET DATA

| | A | B | C | D | E | F | G | H | I |
|---|---|---|---|---|---|---|---|---|---|
| 1 | Employee Name | Address | City | State | Job Title | Salary | Yr hired | Avg Salary | Last name |
| 2 | Abi, James | 510 Coolidge Rd | Harborview | CT | Developer | 160k | 2022 | 94k | James |
| 3 | Akheem, Raj | 110 S Maryville St | Monroe | NM | Developer | 145k | 2017 | 94k | Akheem |
| 4 | Anders, Wilma | 33200 High St #100 | Corbin | DE | Sys Arch | 132k | | | |
| 5 | Allen, Darren | 1690 Ten Mile Rd | Mapleton | NJ | Manager | 145k | | | |
| 6 | Azul, Amy | 1240 Walliford Ct | Edwards | MD | Marketing | 172k | | | |
| 7 | Baker, Devin | 3303 W Evergreen Pl | Monroe | NM | HR Director | 145k | | | |
| 8 | Benson, Charles | 648 Smythe St SW | Montrose | CO | Sys Arch | 164k | | | |
| 9 | Beck, Thomas | 92 Captain Lane | Carbondale | AZ | Developer | 124k | | | |
| 10 | Biggins, Margo | 67441 Lookout Mtn Dr | Mapleton | NJ | Sys Arch | 164k | | | |
| 11 | Bishop, Sonny | 31721 Commerce Ave | Harborview | CT | Developer | 132k | | | |
| 12 | Bork, Phillip | PO Box 5171 | Corbin | DE | Sys Admin | 123k | | | |
| 13 | Cady, Diane | 1066 S Green Blvd | Edwards | MD | Sr Developer | 152k | | | |
| 14 | | | | | | | | | |
| 15 | | | | | | | | | |
| 16 | | | | | | | | | |

TASK PANE

FIGURE 5G

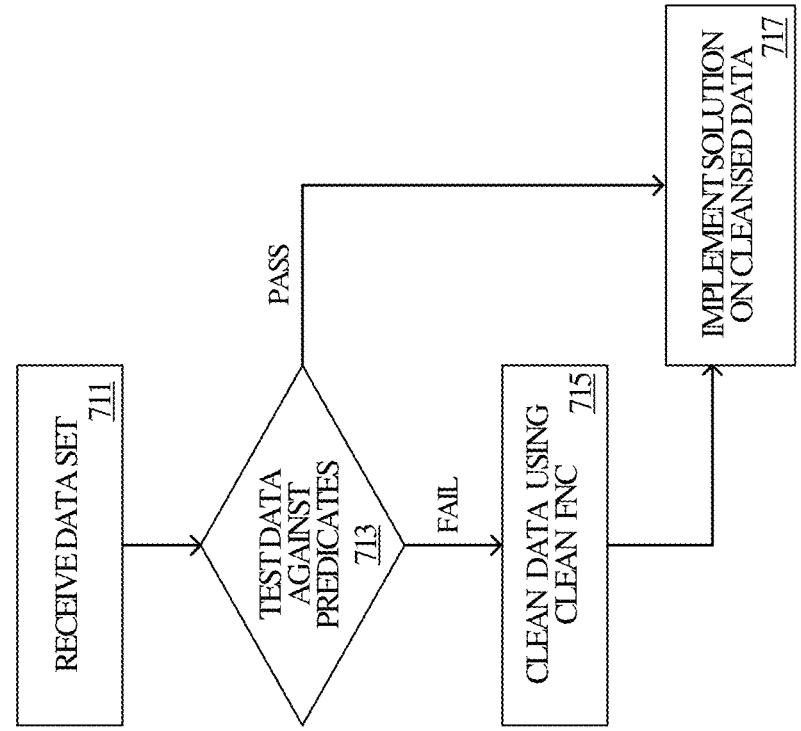
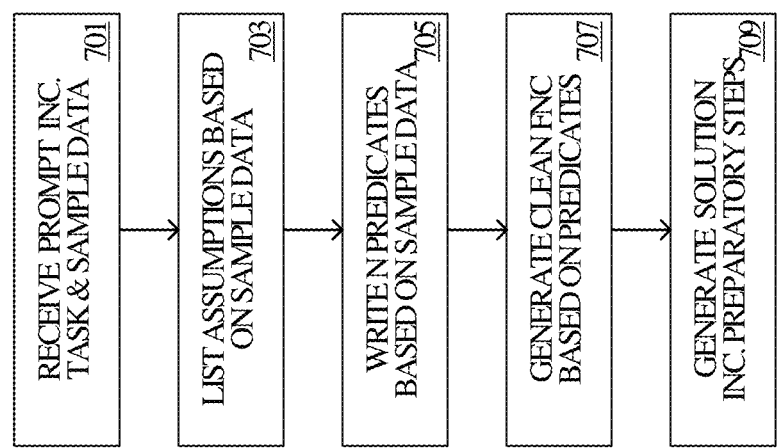
FIGURE 7

FIGURE 8

800 — RAW DATA

| | A | B | C | D | E |
|---|---|---|---|---|---|
| | Transaction ID | Client ID | Transaction No. | Order Total | Sales Associate |
| 1 | 32838769 | 5516AJ | 022 | $ 6,812 | AJP |
| 2 | 06898850 | 5516AJ | | $ 125 | BST |
| 3 | 41457772 | 2895NP | 581 | $ 3,780 | BST |
| 4 | 82403256 | 4325XL | 416 | $ 4,246 | AJP |
| 5 | 76028115 | 5611BK | -022 | $ 184 | BST |
| 6 | 43162521 | 2895NP | % | $ 145 | PMP |
| 7 | 69107610 | 3920DD | 544 | $ 2,961 | AJP |
| 8 | 69052238 | 4325XL | 420 | $ 7,696 | PMP |
| 9 | 04506572 | 4325XL | 422 | $ 4,219 | QKL |
| 10 | 77621028 | 5516AJ | 023 | $ 1,405 | BST |
| 11 | 80317077 | 862 | 514 | $ 4,236 | PMP |
| 12 | 38625058 | 5611BK | 888 | $ 467 | PMP |
| 13 | 69107610 | 3920DD | 544 | $ 2,961 | AJP |

803 — CLEANSED DATA

| | A | B | C | D | E |
|---|---|---|---|---|---|
| | Transaction ID | Client ID | Transaction No. | Order Total | Sales Associate |
| 1 | 43162521 | 2895NP | 001 | $ 145 | PMP |
| 2 | 41457772 | 2895NP | 581 | $ 3,780 | BST |
| 3 | 69107610 | 3920DD | 544 | $ 2,961 | AJP |
| 4 | 82403256 | 4325XL | 416 | $ 4,246 | AJP |
| 5 | 69052238 | 4325XL | 420 | $ 7,696 | PMP |
| 6 | 04506572 | 4325XL | 422 | $ 4,219 | QKL |
| 7 | 06898850 | 5516AJ | 001 | $ 125 | BST |
| 8 | 32838769 | 5516AJ | 022 | $ 6,812 | AJP |
| 9 | 77621028 | 5516AJ | 023 | $ 1,405 | BST |
| 10 | 76028115 | 5611BK | 001 | $ 184 | BST |
| 11 | 38625058 | 5611BK | 888 | $ 467 | PMP |

805 — CLEANSED DATA WITH SOLUTION

| | A | B | C | D | E | F |
|---|---|---|---|---|---|---|
| | Transaction ID | Client ID | Transaction No. | Order Total | Sales Associate | Commission |
| 1 | 43162521 | 2895NP | 001 | $ 145 | PMP | $ 5.82 |
| 2 | 41457772 | 2895NP | 581 | $ 3,780 | BST | $ 151.21 |
| 3 | 69107610 | 3920DD | 544 | $ 2,961 | AJP | $ 118.43 |
| 4 | 82403256 | 4325XL | 416 | $ 4,246 | AJP | $ 169.84 |
| 5 | 69052238 | 4325XL | 420 | $ 7,696 | PMP | $ 307.83 |
| 6 | 04506572 | 4325XL | 422 | $ 4,219 | QKL | $ 168.74 |
| 7 | 06898850 | 5516AJ | 001 | $ 125 | BST | $ 5.03 |
| 8 | 32838769 | 5516AJ | 022 | $ 6,812 | AJP | $ 272.49 |
| 9 | 77621028 | 5516AJ | 023 | $ 1,405 | BST | $ 56.20 |
| 10 | 76028115 | 5611BK | 001 | $ 184 | BST | $ 7.36 |
| 11 | 38625058 | 5611BK | 888 | $ 467 | PMP | $ 18.67 |

| | C | D | E | F | G | H | I | J | K |
|---|---|---|---|---|---|---|---|---|---|
| 1 | Hire Date | Benefits | Salary | Job Rating | Bonus | | | | |
| 2 | 27-Aug-09 | DMR | 69,806 | 4 | 2,000 | | | | |
| 3 | 29-Jan-14 | DMR | 47,323 | 4 | 2,000 | | | | |
| 4 | 20-Oct-16 | DMR | 56,322 | 5 | 3,000 | | | | |
| 5 | 16-Sept-19 | D | 56,760 | 3 | 900 | | | | |
| 6 | 26-Sep-20 | R | 63,281 | 1 | | | | | |
| 7 | 3-Jan-09 | R | 87,031 | 3 | 900 | | | | |
| 8 | 23-Apr-10 | | 45,403 | 4 | 2,000 | | | | |
| 9 | 25-Nov-15 | DMR | 102,023 | 2 | 99 | | | | |
| 10 | 5-Sep-21 | M | 124,232 | 5 | 3,000 | | | | |
| 11 | 17-May-21 | DM | 88,436 | 4 | 2,000 | | | | |
| 12 | 9-Oct-20 | | 61,097 | 2 | 99 | | | | |
| 13 | 19-Oct-07 | | 117,675 | 5 | 3,000 | | | | |
| 14 | 29-Mar-09 | | 72,961 | 5 | 3,000 | | | | |
| 15 | 16-Apr-08 | | 103,141 | 3 | 99 | | | | |
| 16 | 29-Mar-20 | DMR | 119,872 | 1 | | | | | |
| 17 | 27-Jul-17 | M | 98,572 | 3 | 900 | | | | |
| 18 | 27-Sep-07 | | 97,466 | 3 | 900 | | | | |
| 19 | 23-Oct-19 | | 63,770 | 2 | | | | | |
| 20 | 21-Jun-20 | DMR | 88,987 | 4 | 3,000 | | | | |

Add a column
We can create the right formula for you using AI!

FIGURE 9A

PREDICATE-GUIDED PREPARATION FOR LLM INTEGRATIONS IN SPREADSHEET ENVIRONMENTS

RELATED APPLICATIONS

This application is related to and claims the benefit of priority to U.S. Provisional Patent Application No. 63/489,674, entitled PREDICATE-GUIDED PREPARATION FOR LLM INTEGRATIONS IN SPREADSHEET ENVIRONMENTS, and filed on Mar. 10, 2023, the contents of which are hereby incorporated by reference in their entirety.

TECHNICAL FIELD

Aspects of the disclosure are related to the field of productivity applications and large language models and, in particular, to integrations there between.

BACKGROUND

Spreadsheet applications, such as Microsoft Excel®, are widely used for data analysis, data organization and management, and computational tasks involving quantitative as well as qualitative data. Given the broad range of functions and capabilities available in spreadsheet applications, special-purpose artificial intelligence (AI) models have been developed to aid users in figuring out how to accomplish particular tasks. These AI models, such Microsoft Excel's Insights engine, are trained on a vast quantity of spreadsheet data which enables them to identify patterns and generate insights into datasets. However, because the scope of the training is based entirely on spreadsheet data, this constrains the utility of these models to the domain of spreadsheet data and spreadsheet functionalities.

In more recent advances in AI technology, large language models (LLMs), which are a general-purpose type of AI model, have been developed which are capable of natural language communication. Transformer models are a type of AI model used in natural language processing that are designed to process sequences of words, such as sentences or paragraphs. LLMs such as Generative Pretrained Transformer (GPT) models and Bidirectional Encoder Representations from Transformer (BERT) models have been pre-trained on an immense amount of data across virtually every domain of the arts and sciences and have demonstrated the capability of generating responses which are novel, open-ended, and unpredictable.

However, harnessing this capability comes at a cost: LLM integration can introduce latency which negatively impacts the user experience; LLMs require a tremendous amount of compute power to function; and LLMs are known to hallucinate—that is, to imagine information which does not actually exist. Moreover, given the diverse subject matter in the training data used to train LLMs, LLMs may generate a response to an inquiry which diverges so far from what the user is asking that the response ends up being useless.

OVERVIEW

Technology is disclosed herein for the integration of spreadsheet environments and LLM services. In an implementation, an application receives a natural language input from a user associated with a spreadsheet. The application generates a prompt based on the user input and at least a portion of the spreadsheet. The prompt includes a statement of the problem, a request for an LLM service to identify one or more preparatory steps before generating a solution to the problem, and a request to include the one or more preparatory steps in output that includes the solution to problem. The application service receives a reply to the prompt from the LLM service that includes the output. The application service implements the one or more preparatory steps with respect to data in the spreadsheet and implements the solution to the problem with respect to the data in the spreadsheet.

In an implementation, the preparatory steps include cleaning the data. In some implementations, the preparatory steps include generating assumptions about the data and testing the assumptions. The preparatory steps may include, in some implementations, generating predicates based on the assumptions for testing the data. In the same or other implementations, the preparatory steps include generating a cleaning function including operations which are associated with the predicates which are performed on the data.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 5A-5G illustrate an operational scenario for an LLM integration in a spreadsheet environment in an implementation.

FIG. 7 illustrates workflows for an LLM integration with a spreadsheet environment in an implementation.

FIG. 8 illustrates an operational scenario for an LLM integration in an implementation.

FIGS. 9A-9E illustrate an exemplary operational scenario for an LLM integration in a spreadsheet environment in an implementation.

DETAILED DESCRIPTION

Figure 1:
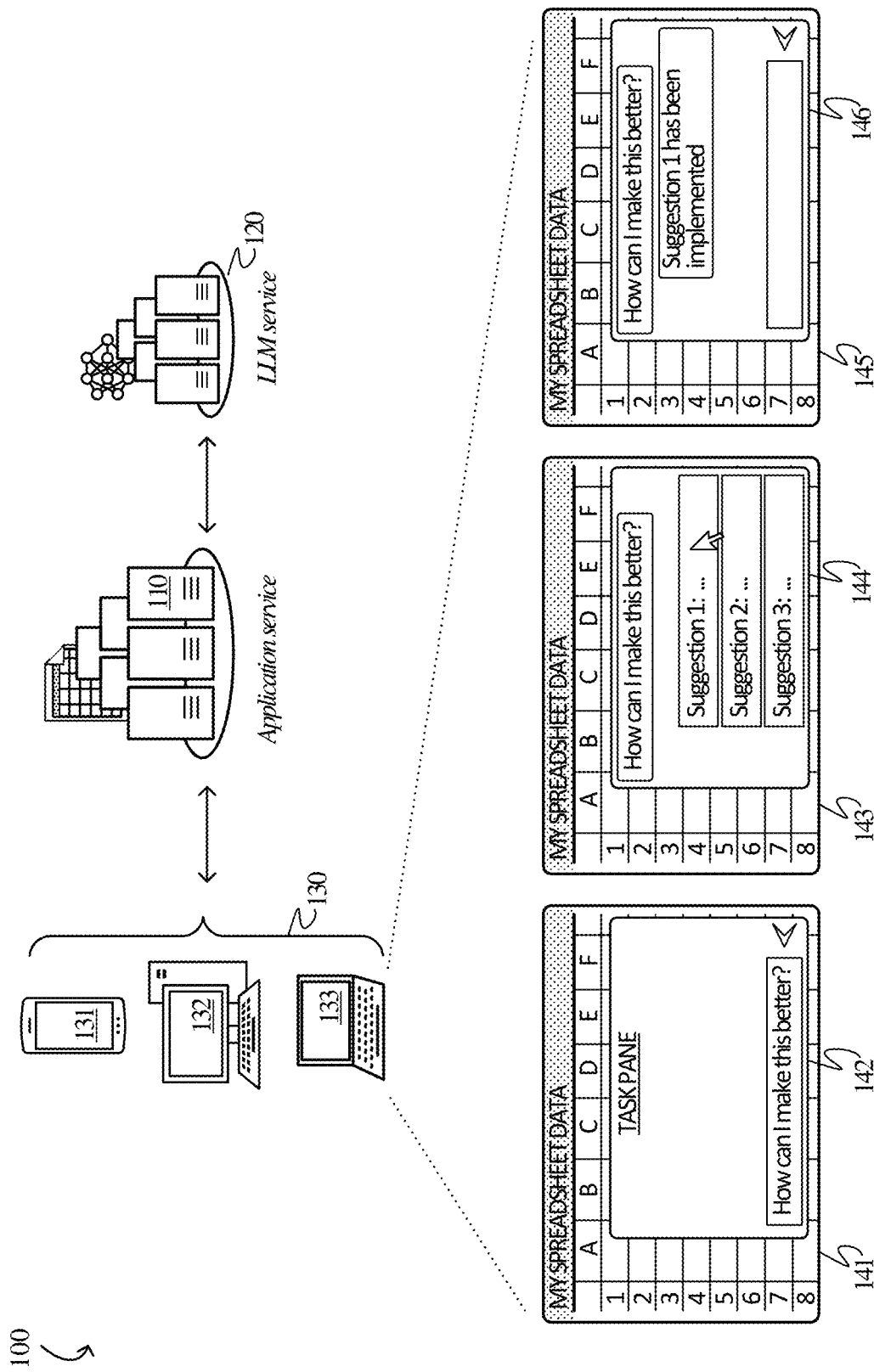
FIG. 1 illustrates an operational environment of an LLM integration with a spreadsheet environment in an implementation.

Various implementations of are disclosed herein for LLM integrations in a spreadsheet environment or productivity application environment capable of hosting a spreadsheet or the like. In an implementation, an application implemented in software on one or more computing devices receives a natural language (NL) input from a user in the context of a spreadsheet and generates a prompt based on the natural language input and at least a portion of the spreadsheet. The application submits the prompt to a large language model (LLM) service (or "LLM") and receives a reply from the LLM. The application then generates a response to the user input based on the reply from the LLM.

The reply from the LLM received by the application can include a suggestion for modifying the spreadsheet, such as adding a calculated column along with a spreadsheet formula. In some implementations, the reply from the LLM includes a self-evaluation of its suggestion, and the application decides whether to display the suggestion or information in a task pane of the user interface based on the suggestion according to the self-evaluation.

Transformer models, of which LLMs are a type, are a class of deep learning models used in natural language processing (NLP) based on a neural network architecture which use self-attention mechanisms to process input data and capture contextual relationships between words in a sentence or text passage. Transformer models weigh the importance of different words in a sequence, allowing them to capture long-range dependencies and relationships between words. GPT, BERT, ERNIE (Enhanced Representation through kNowledge IntEgration), T5 (Text-to-Text Transfer Transformer), and XLNet models are types of transformer models which have been pretrained on large amounts of text data using a self-supervised learning technique called masked language modeling. This pretraining allows the models to learn a rich representation of language that can be fine-tuned for specific NLP tasks, such as text generation, language translation, or sentiment analysis.

In some implementations of LLM integrations in a spreadsheet environment, the user-supplied natural language input includes text which expresses a general inquiry about the content of the spreadsheet, and the reply from the LLM includes a general description about the content of the spreadsheet. For example, the input may broadly request an idea or suggestion to make a data table of the spreadsheet better without reference to improving a particular aspect of the data table, such as a column, row, or format of an element of the table, and without requesting a particular type of analysis of data in the table. The LLM may reply with a summary describing the table, the information it contains, the scope of the data in the table, possible uses of the table, and so on. The application displays the reply provided by the LLM in a task pane in the user interface of the application. In some implementations, the application may display the reply with graphical input devices by which the user can interact with the reply, such as entering a second input in response to the reply from the LLM (e.g., asking for more information about an aspect of the reply), copying the reply to a clipboard, requesting more information about how the reply was generated, and so on.

In some scenarios, the user's general inquiry is ambiguous or underspecified, and the application prompts the LLM to interpret the reply in multiple ways and to generate suggestions based on the multiple interpretations. The accuracy or appropriateness of the suggestions with respect to the inquiry may depend on additional information not provided in the inquiry, such as the user's possible intentions in making the inquiry. For example, the user may ask, "How can I get better results?" The application may include in its prompt to the LLM an instruction to interpret the inquiry in multiple ways and to generate suggestions based on the interpretations. The application presents the suggestions generated by the LLM to the user in the task pane. The application may submit a follow-up prompt based on the user's selection of a suggestion, including in the contextual information of the prompt the selection made by the user, thereby to receive a more focused reply or suggestion from the LLM.

In some implementations, the user's natural language input includes text which expresses a request to modify a specified portion of the spreadsheet in a specific way, and the reply from the LLM includes a specific suggestion for modifying the spreadsheet in the specific way. For example, the user may submit a request in the user interface of the application to summarize sales data which is listed in multiple columns of a data table of the user's spreadsheet. The application will configure a prompt which contains the substance of the request along with a relevant portion of the spreadsheet (e.g., the column headers, row headers, and the first five rows of table data) which it submits to the LLM. The LLM, upon receiving the configured prompt, generates a reply which suggests adding a column which computes a total sales quantity based on year-to-date (YTD) sales data along with a spreadsheet formula to calculate the quantity. Based on the reply, the application displays the suggestion along with the formula in the user interface of the spreadsheet. In an implementation, the application generates a preview of the column to be added to the data table based on the suggestion, i.e., a column calculating YTD sales data based on the table data and using the formula provided in the reply of the LLM, which the user may then direct the application to implement.

In some implementations, the user's natural language input includes text which expresses a request including a hypothetical scenario based on the spreadsheet data. For example, the user may pose a "What if" type question which involves analyzing the spreadsheet data to generate an inference or a predicted result. The application will configure a prompt which contains the substance of the request along with a relevant portion of the spreadsheet (e.g., the column headers, row headers, and the first five rows of table data) which it submits to the LLM. The LLM, upon receiving the configured prompt, generates a reply which suggests a formula by which a predicted result can be calculated, along with a description of the formula and an explanation of the formula. The application generates a response to the input based on the reply from the LLM, which can include displaying a smaller data table in the task pane which demonstrates how the predicted result is calculated.

In responding to the user's input, the application extracts suggestions (e.g., suggested formulas) based on the reply from the LLM and displays the suggestions in the user interface of the application. The application determines an order in which to display the suggestions based, for example, on self-evaluations of the suggestions by the LLM.

For example, the reply may suggest three formulas and indicate that one of the formulas is the most relevant with respect to the input or the prompt. In the user interface, the user can select a suggestion for implementation, such as implementing a suggested table name or table format, or ask for more information about a suggestion, such as a detailed explanation of a suggested formula.

In some implementations, when the application sends a portion of the spreadsheet (e.g., a portion of a data table in a spreadsheet) to the LLM along with a prompt, the application may rename the row or column headers when the application determines that the headers may confuse or mislead the LLM. For example, the application may expand abbreviations in the column headers of a data table. The application stores a correspondence between the original column headers (i.e., those displayed in the user interface) and the column headers which are supplied to the LLM in the prompt. The application uses the correspondence when displaying the reply in the user interface by translating the reply so it refers to the original column headers in place of the column headers supplied to the LLM (e.g., replacing the expanded-form words or terms with their abbreviations).

To generate a prompt based on a user's natural language input, the application will configure the prompt according to one or more of: the scope of the problem, the tasks to be completed, illustrative examples, sample data or spreadsheet contextual information, rules, the output format, and a cue to get the LLM to complete the task and not ramble. The scope of the problem refers to the domain in which the problem is to be addressed. For example, the prompt may instruct the LLM to limit its reply to Microsoft Excel® formulas and not Google Sheets formulas. The tasks to be completed include instructions, such as, "generate a formula to do X and self-evaluate the formula." Illustrative examples can include an example of how to self-evaluate a formula when the formula is relatively complex. An illustrative example provides the LLM with guidance on how to complete a task of the prompt. Sample data refers to selecting a portion of the data in a spreadsheet (e.g., the first five rows of data) to send with the prompt to provide the LLM with contextual information. Rules are specific rules by which the LLM is to answer the inquiry. For example, the prompt may tell the LLM not to fix typos detected by the LLM in column headers. Rules may be specific to the scope of the prompt. The output format specifies that the reply of the LLM will be in a parse-able format, such as enclosing elements of the reply within semantic tags or within a JavaScript Object Notation (JSON) data object, so the application can extract the elements and present the information in a natural language format for the user.

Other factors that affect the output of or reply by the LLM are the sequencing of the components of the prompt, examples in relation to the tasks, repetitions, and special tokens. The sequencing of the components refers to the various parts of the prompt being configured or stitched together in different ways. Because the LLM may weight the parts of the prompt according to how close they are to the end of the prompt (e.g., the parts that are closer to the end of the prompt more heavily), the application can leverage this characteristic to get the LLM to focus on the spreadsheet data and avoid a reply from the LLM which includes a generic formula or solution or which refers to imaginary data. For example, the prompt may position spreadsheet contextual information or domain toward the end of the prompt. The examples provided in the prompt can be highly influential with respect to the quality of the output from the LLM. For example, using a specific type of date format in an example can influence the LLM to use a similar data format in the formula it produces. Repetition of parts of the prompt may be necessary to remind the LLM or to keep the LLM on task. Special tokens are certain words or tokens (i.e., "magic words") that can influence the quality of the output that the LLM model produces. For example, the presence of the word "relationship" in the prompt may produce higher quality formulas.

In some implementations, the application configures a prompt based on a user inquiry to task the LLM with producing multiple alternative suggestions in response to the prompt along with self-evaluations of the suggestions. In an implementation, the application requests the LLM categorize the multiple suggestions that it generates according to correctness, accuracy, appropriateness, toxicity (i.e., containing offensive content), and so on. For example, where the user input relates to computing an average of data in a data table, the LLM may produce formulas for generating columns for various types of averages, such a mean, a weighted mean, a trimmed mean, a median, a mode, and so on. The prompt may further task the LLM with self-evaluating the suggestions according to the contextual data provided in the prompt and eliminate suggestions which are inaccurate, inappropriate, low utility, or in which the LLM has determined a low level of confidence. For example, the LLM may determine that computing a mode and a weighted mean of the data will not be as useful, based on the contextual information, as the other types of averages. The LLM eliminates those suggestions and sends the remaining suggestions to the application for generating its response(s) to the input.

In some scenarios, if the LLM determines that all or almost all of its suggestions should be eliminated, the prompt tasks the LLM with generating an explanation for why a formula or specific suggestion could not be presented and what additional information would allow the LLM to provide a better (e.g., more useful) reply.

In requesting alternative suggestions, the prompt asks the LLM to generate a complete set of variations based on the substance of the prompt, regardless of the how broad or specific the user's input is. The application may order the alternative suggestions or eliminate suggestions based on their self-evaluations and present the alternative suggestions in the task pane of the user interface based on the self-evaluations.

In addition to or as part of the self-evaluation, the LLM may also be tasked in the prompt with producing an evaluation of intent quality and/or problem difficulty. Intent quality refers to the quality of the user query with respect to toxicity, ambiguity, relevance to the data, and so on. Problem difficulty refers to whether the formula generated by the LLM is easy or difficult (e.g., simple or complex). For example, if the user request is determined to be ambiguous, the application may direct the LLM to produce a formula and suggest alternative interpretations of the query rather than simply responding that the LLM does not understand the request. With alternative interpretations of the query, alternative suggestions can be generated to present to the user in the user interface. Selections made by the user to the alternative suggestions (e.g., the user selects one of the suggestions for implementation) provide additional contextual information for prompts based on follow-on inputs made by the user.

In some scenarios, the application displays in the user interface of the spreadsheet application a task pane including a chat interface by which the application can receive user-supplied natural language inputs and display responses to the inputs based on the replies generated by the LLM. The task pane may also include graphical input devices by which the user can make selections, such as selecting one of multiple alterative suggestions. In some implementations, the application may display a formula suggested by the LLM with a natural language explanation of the formula. The application may also display a data table in the task pane to demonstrate a calculation suggested by the LLM using data from the spreadsheet.

The chat interface displays a turn-based conversation through which the user can iterate or step through multiple revisions of the spreadsheet which are responsive to the user's inquiries. As more inputs are received, the chat history adds to the contextual information that is used by the LLM to provide more accurate results, i.e., results which are increasingly responsive to the user's inquiries during the conversation. As the LLM is presented with more contextual information, the results (i.e., suggestions) generated by the LLM will be more specific to the user's inquiries and to the spreadsheet context.

In an implementation, the application tailors the natural language input to generate a prompt such that the LLM will produce its reply optimally in terms of latency, creativity, utility, coherence, and so on. The application may rewrite or reconfigure the user-supplied input to cause the LLM to generate a reply with minimal latency to minimize negative impacts to the user experience and costs to productivity. The application may also tailor the natural language input to more fully leverage the creativity of the LLM while reducing the probability that the LLM will, for example, digress or hallucinate (i.e., refer to or imagine things that do not actually exist) which can frustrate the user or further impair productivity.

Other technical advantages accrue from the disclosed technology. Implementing data preparation prior to deploying an LLM-generated solution or deploying an LLM-generated solution with integrated data preparation streamlines spreadsheet data processing and streamlines the user experience, improving productivity and reducing productivity costs. Tailoring prompts tailored according to the disclosed technology reduces the amount of data traffic between the application service and the LLM for generating useful information for the user. For example, the disclosed technology keeps the LLM on task and reducing the incidence of erroneous, inappropriate, or off-target replies and promotes more rapid convergence, that is, reducing the number of interactions with the LLM to generate a desired result.

In addition, the disclosed technology focuses the generative activity of the LLM to improve the performance of the LLM without overwhelming the LLM (e.g., by exceeding the token limit). For example, the disclosed technology balances prompt size (e.g., the number of tokens in the prompt which must be processed by the LLM) with providing sufficient information to generate a useful response. The net of streamlined interaction, more rapid convergence, and optimized prompt sizing is reduced data traffic, faster performance by the LLM, reduced latency, and concomitant improvements to productivity costs and to the user experience.

Turning now to the Figures, FIG. 1 illustrates operational environment 100 in an implementation. Operational environment 100 includes application service 110, LLM service 120, and computing devices 130. Application service 110 hosts a productivity application such as a spreadsheet application (e.g., Microsoft Excel) to endpoints such as computing devices 130 which execute applications that provide a local user experience and that interface with application service 110. The applications running locally with respect to computing devices 130 may be natively installed and executed applications, browser-based applications, mobile applications, streamed applications, or any other type of application capable of interfacing with application service 110 and providing a user experience, such as the user experiences 141, 143, and 145. The spreadsheet environment of application service 110 may be implemented a natively installed and executed application, a browser-based application, or a mobile application, and may execute in a stand-alone manner, within the context of another application such as a presentation application or word processing application, with a spreadsheet functionality, or in some other manner entirely. LLM service 120 hosts a generative pretrained transformer (GPT) computing architecture such as GPT-3®, GPT-3.5, ChatGPT®, or GPT-4.

Figure 13:
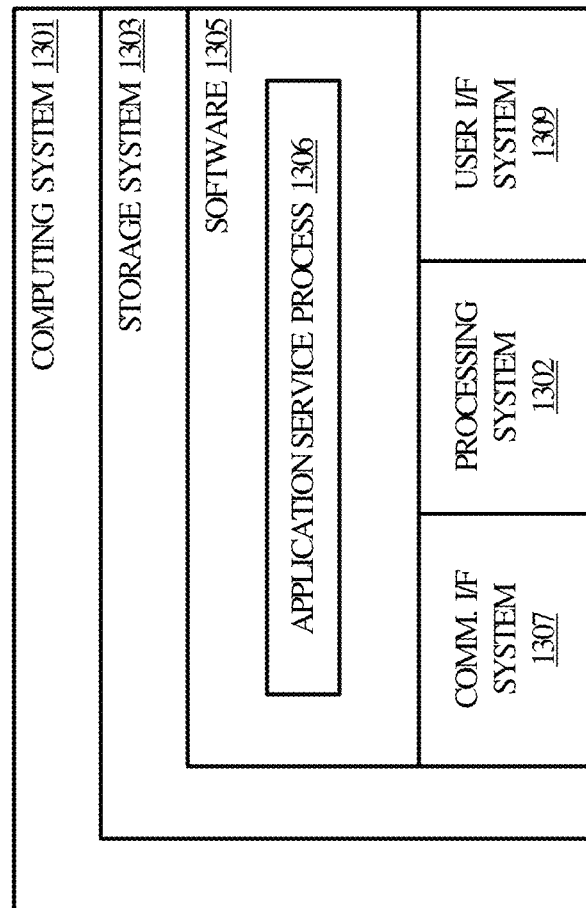
FIG. 13 illustrates a computing system suitable for implementing the various operational environments, architectures, processes, scenarios, and sequences discussed below with respect to the other Figures.

Computing devices 130 are representative of computing devices, such as laptops or desktop computers, or mobile computing devices, such as tablet computers or cellular phones, of which computing device 1301 in FIG. 13 is broadly representative. Computing devices 130 communicate with application service 110 via one or more internets and intranets, the Internet, wired or wireless networks, local area networks (LANs), wide area networks (WANs), and any other type of network or combination thereof. A user interacts with the productivity application of application service 110 via a user interface of the application displayed on any of computing devices 130. User experiences 141, 143, and 145, including task panes 142, 144, and 146, respectively, are representative of user experiences of a spreadsheet environment of a productivity application hosted by application service 110 in an implementation.

Application service 110 is representative of one or more computing services capable of hosting a productivity application such as a spreadsheet application and interfacing with computing devices 130 and with LLM service 120. Application service 110 may be implemented in software in the context of one or more server computers co-located or distributed across one or more data centers.

LLM service 120 is representative of one or more computing services capable of hosting an LLM computing architecture and communicating with application service 110. LLM service 120 may be implemented in the context of one or more server computers co-located or distributed across one or more data centers. LLM service 120 hosts a deep learning AI transformer model, such as ChatGPT®, BERT, ERNIE, T5, XLNet, and the like, which is integrated with the spreadsheet environment associated with application service 110.

In operation, the user of computing device 133 interacts with application service 110 via a natural language interface of task pane 142 in user experience 141. In user experience 141, the user keys in a natural language statement or inquiry ("How can I make this better?"). Application service 110 creates a prompt based on the user's statement including contextual information of the spreadsheet. Application service 110 submits the prompt to LLM service 120. LLM service 120 generates a reply to the prompt and sends the reply to application service 110. In an implementation, application service 110 instructs LLM service 120 in the prompt to provide multiple interpretations of the inquiry and to generate multiple alternative suggestions based on the interpretations.

Application service 110 configures a response to the user's statement based on the reply from LLM service 120 and displays the response in user experience 143. In task pane 144 of user experience 143, application service 110 displays three cards, each containing, in a natural language format, one of three suggestions provided by LLM service 120. Application service 110 may display the suggestions according to how LLM service 120 self-evaluated the suggestions, e.g., according to relevance to the input or correctness. In some implementations, when the user moves the cursor to hover over a card in the user interface, application service 110 displays a preview of the suggestion (such as a preview of column to be added) in the spreadsheet. Application service 110 may also include graphical buttons by which a user can request more information about a suggestion or report an inappropriate suggestion to application service 110.

Upon receiving the user's selection of the first suggestion in task pane 144, application service 110 implements the suggestion by adding a column (not shown) to the spreadsheet data. In task pane 146 of user experience 145, application service 110 configures and displays suggested actions in natural language based on the chat history and spreadsheet contextual information. The suggested actions may be based on a higher-ranked suggestion received from LLM service 120 in response to the user's original input.

Notably, application service 110 may execute a specific-purpose AI model, such as Microsoft Excel Insights, independent from the integration of the LLM model in the spreadsheet environment. Inquiries submitted by the user to the specific-purpose AI model may execute in parallel with the application service methods disclosed herein. For example, a user may use Insights to generate a pivot table relating to a data table in the spreadsheet environment, where the pivot table is generated by Insights based on the entire data table. In addition to and in parallel with the interaction with Insights, the user may submit an input to task pane 142 causing application service 110 to generate and send a prompt to LLM service 120 based on the input, with the prompt including a portion of the data table, such as the first 3-5 rows or a particular column of data.

Figure 2:
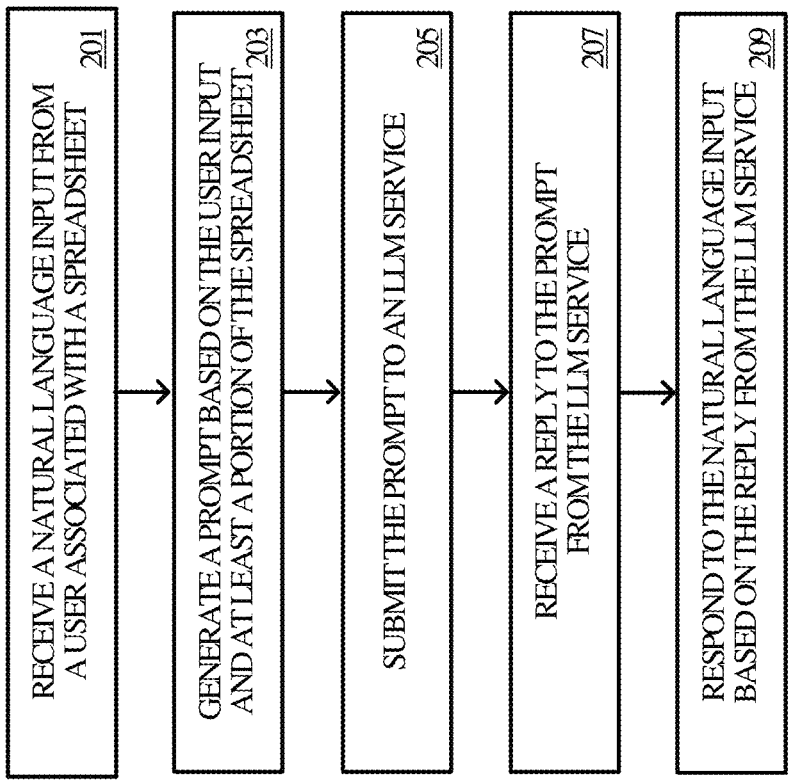
FIG. 2 illustrates a method of operating a spreadsheet application in an implementation.

FIG. 2 illustrates a method of operation for an LLM integration with a spreadsheet environment in an implementation, herein referred to as process 200. Process 200 may be implemented in program instructions in the context of any of the software applications, modules, components, or other such elements of one or more computing devices. The program instructions direct the computing device(s) to operate as follows, referred to in the singular for the sake of clarity.

An application service hosts a web-based productivity application such as a spreadsheet and displays a user interface for a client application of the application service on a user computing device remote from the application server. The application service also interfaces with an LLM service based on inputs received from the user. In an implementation, the application service receives a natural language input from the user in association with the application (step 201). The user keys in a natural language input in a chat interface in the user interface displayed on the computing device. The natural language input may refer to the spreadsheet generally, to a data table of the spreadsheet, to data in the spreadsheet, such as rows or columns of data, to the format of the spreadsheet, etc.

The application service generates a prompt for the LLM service based on the input and at least a portion of the spreadsheet (step 203). In an implementation, the prompt includes contextual information, such as the chat history and a portion of the spreadsheet including row and column headers and a subset of the data. The prompt may also include rules, such as a rule to provide a self-evaluation of suggestions generated by the LLM service. The prompt may also direct the LLM service to assess the level of complexity or difficulty of a suggestion or of a formula of a suggestion and to provide a natural language description and/or explanation of the formula. The prompt may also direct the LLM service to assess the substance of the inquiry in terms of the user's intent, e.g., whether the intent is ambiguous, whether the request is directed to analyzing the data, or whether the request is directed to generating more user-friendly table format.

The prompt may also direct the LLM service to provide the suggestions in a parseable output format, that is, in a format which facilitates extracting the components of the reply based on information type. The parse-able output format can include enclosing elements of the reply in tags (e.g., semantic tags such as <suggestion> and </suggestion>, <formula> and </formula>, etc.), as a JSON data object, or in another data structure. The prompt may also include a rule or instruction to generate multiple suggestions in response to the input or multiple suggestions based on multiple interpretations of the input.

Having configured a prompt based on the user input, the application service submits the prompt to the LLM service (step 205). The application service receives a reply to the prompt from the LLM service (step 207). The reply to the prompt may include one or more suggestions generated based on the prompt and in accordance with any rules, instructions, or parameters provided in the prompt.

Having received a reply from the LLM service, the application service responds to the input based on the reply (step 209). In some implementations, the application service generates a graphical card for each suggestion for display in the user interface. For example, a suggestion may include a spreadsheet formula which references existing columns in the spreadsheet along with a brief title and description of the formula and an explanation of the formula. The application service generates a card for the suggestion which presents the elements of the suggestion in a user-friendly or natural language format. The card may also include graphical buttons by which the user can select to, for example, implement the suggestion in the spreadsheet (e.g., add the suggestion column to the spreadsheet), to view a more detailed explanation of a formula, to see a sample calculation of the formula, and so on. In some scenarios, the application service may create and display a data table in the user interface which demonstrates a suggestion calculation or suggested table configuration. The application service may also present the user with the option of creating a new worksheet including the data table suggested by the LLM service. In some implementations, the application service may also display further inquiries suggested by the LLM service to discern the intent of the user and provide a more focused reply.

In some implementations, the user's input may refer to performing an analysis of the data in the table to generate a prediction, such as in a what-if scenario. The LLM service may present suggestions for answering the user's query but may also present additional suggestions related to the input. The LLM service may generate suggestions relating to data columns or rows to be added, formulas for quantities to be calculated, table formatting, summary tables based on the table data, and so on.

Referring once again to FIG. 1, operational environment 100 includes a brief example of process 200 as employed by application service 110 with respect to input received from computing device 131 and to replies received from LLM service 120.

In operational environment 100, a user at computing device 131 submits an inquiry to application service 110 which relates to a spreadsheet of a productivity application hosted by application service 110 and displayed in a client application or in a browser-based application on computing device 131. The input is provided in natural language, that is, as if the user is speaking to another person.

Application service 110 receives the input and generates a prompt to be submitted to LLM service 120 based on the input. The prompt includes contextual information, such as a chat history and spreadsheet data or metadata, such as a table name, worksheet name, or spreadsheet name, row and column headers, and at least a subset of the data, e.g., the first five or ten rows of data. Contextual information can also include the recent or latest actions performed by the user on the spreadsheet, such as the user creating a new column or entering a formula. Contextual information can also include errors detected in the spreadsheet.

In the prompt provided to LLM service 120, application service 110 may specify tasks to be performed by LLM service 120. Tasks in the prompt can include generating the reply in a particular output format and providing an analysis or evaluation of the suggestions in the reply such as the accuracy or appropriateness of the suggestion relative to the input, an evaluation of the complexity of a formula or calculation in a suggestion, an assessment of the ambiguity or intent of the input, and/or an interpretation of the substance of the input.

Next, application service 110 submits the prompt to LLM service 120. LLM service 120 generates a reply to the prompt and transmits the reply to application service 110. The reply may contain multiple suggestions for accomplishing a task or action proposed in the input. Suggestions can relate to aspects of the table format or table data. The scope of the suggestions may be novel and inventive based on LLM service 120's training with other spreadsheets, but the suggestions generated by LLM service 120 are constrained by the prompt to the domain of the spreadsheet application. For example, if LLM service 120 suggests a new type of data to be added to a spreadsheet, the suggested formula or the suggested output format of the formula will reference the functions or formatting rules of the application hosted by application service 110.

Application service 110 receives the reply from LLM service 120 and generates a response to the user's input based on the reply. The response to the input is displayed by application service 110 in the user interface of the application, such as in task pane 142 or chat interface. The response may include the reply or the suggestions within the reply presented in a natural language format. Suggested formulas may be displayed along with natural language descriptions and/or explanations of the formulas. The response may include suggestions for other actions the user may want to implement, such as suggesting a follow-on input or viewing a preview of a suggestion.

Figure 3:
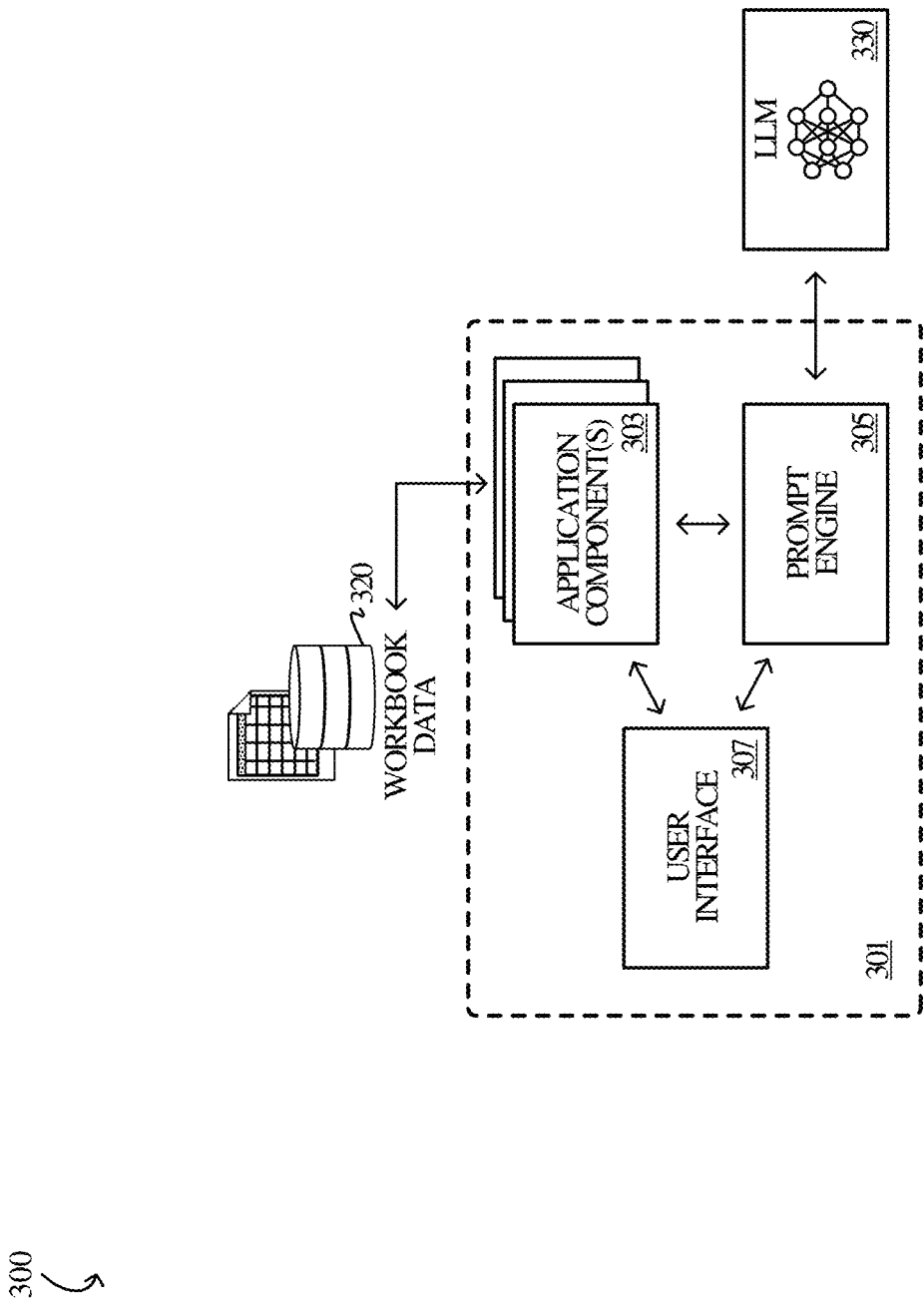
FIG. 3 illustrates a systems overview for integrating an LLM in a spreadsheet environment in an implementation.

Turning now to FIG. 3, FIG. 3 illustrates system architecture 300 including application 301, workbook data 320, and LLM 330. Application 301, of which application service 110 is representative, includes one or more application component(s) 303, prompt engine 305, and user interface 307. Application component(s) 303 (referred to hereinafter in the singular for the sake of clarity) are representative of the various components, engines, and modules of a spreadsheet application, such as computational engines, charting engines, macro engines, Visual Basic modules, formatting components, etc. Application 301 displays workbook data 320 in user interface 307 and receives user input relating to workbook data 320 from user interface 307. Prompt engine 305 of application 301 generates prompts for LLM 330 based on user input received from a user through user interface 307 and receives replies to the prompts from LLM 330.

Figure 4:
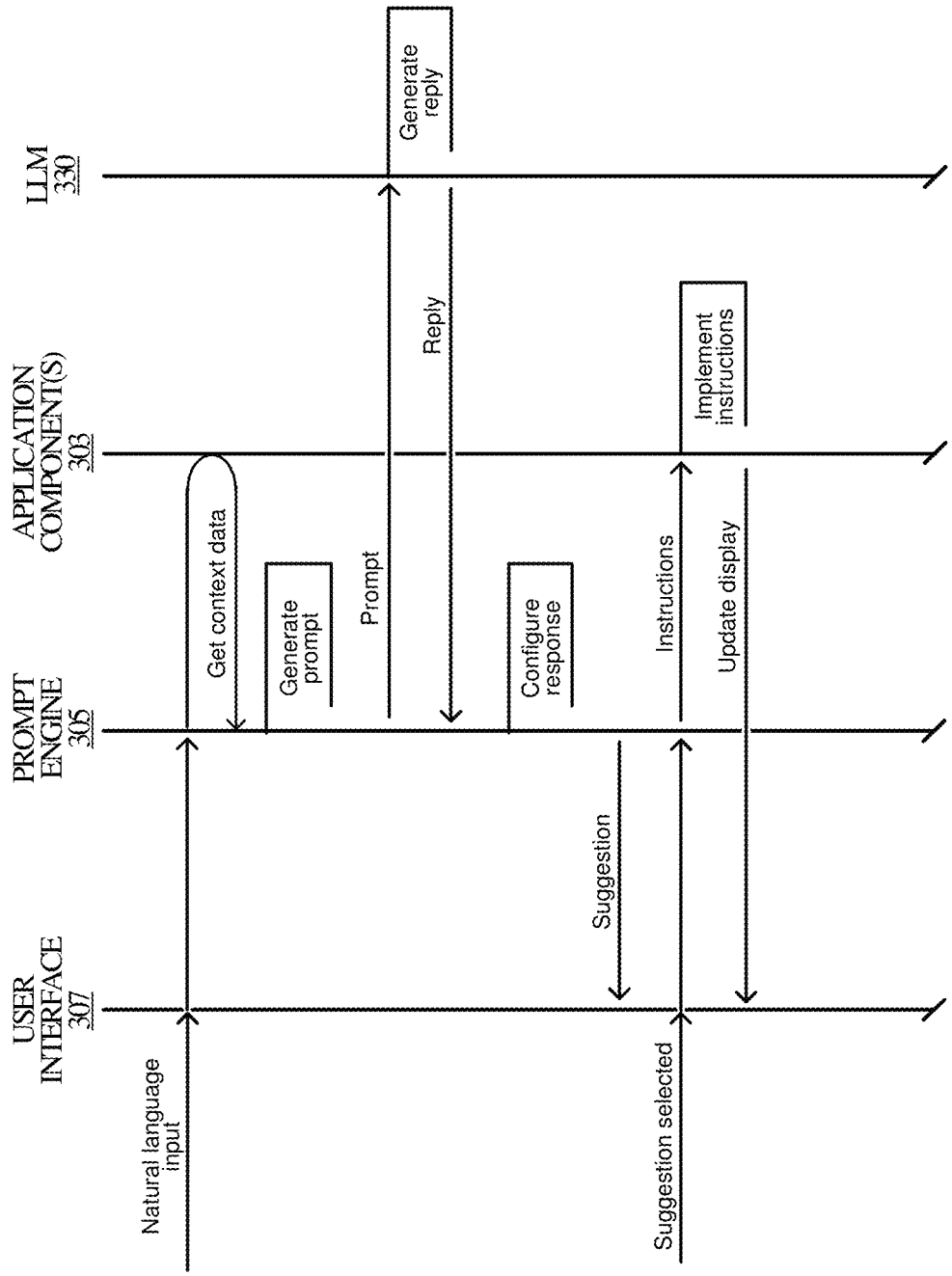
FIG. 4 illustrates an operational scenario for an LLM integration in a spreadsheet environment in an implementation.

FIG. 4 illustrates operational scenario 400 of an LLM integration with a spreadsheet environment and referring to elements of FIG. 3 in an implementation. In operational scenario 400, prompt engine 305 receives a natural language input from a user via user interface 307, such as in a task pane or chat interface in user interface 307. The input may be a text entry keyed into a textbox of user interface 307 by the user or a spoken communication from the user captured by a microphone on the user computing device and which is translated to text by a speech-to-text engine. The input includes a request or query regarding workbook data 320. Prompt engine 305 configures a prompt based on the input for submission to LLM 330.

To configure the prompt, prompt engine 305 identifies a prompt template according to the type of request in the input in an implementation. Prompt templates can include prompt configurations for suggesting a calculated column to be added to workbook data 320, for a general inquiry about workbook data 320, for analyzing data in workbook data 320 to project a result, such as for a hypothetical scenario, and so on. Using a selected prompt template, prompt engine 305 configures a prompt to include the input or the substance of the input and contextual information from application 301, e.g., from various ones of application component 303. Contextual information may include a chat history of user inputs and replies from LLM 330 and spreadsheet data, such as table information and at least a portion of the spreadsheet data. The portion of spreadsheet data included in the prompt may be column headers, row headers, a table name, and the first few rows of data or another portion or subset of the data that is relevant to the request. For example, if the user input asks in user interface 307 how a column of last names can be added to a data table in workbook data 320 based on a name column in the data table, prompt engine 305 may provide several entries in the name column in the prompt.

Prompt engine 305 configures the prompt including parameters to direct LLM 330 to provide a focused response to the input. Prompt parameters include the scope of the prompt, the output format of the reply to produce a reply in a parse-able format, instructions or tasks, examples including sample data or sample data formatting, special tokens which influence the behavior of LLM 330, and so on. Prompt engine 305 may configure the order of the information in the prompt to position the most important information toward the end of the prompt based on LLM 330 weighting later prompt information more heavily.

In an implementation, prompt engine 305 includes tasks in the prompt which are to be completed by LLM 330 in generating its reply. Tasks can include an instruction to generate a self-evaluation of the suggestions or suggested formulas that LLM 330 produces in response to the prompt. LLM 330 may also be tasked with generating a description of a suggested formula, including a brief title of the formula, and an explanation of the suggested formula. LLM 330 may also be tasked with evaluating the difficulty of the formula (e.g., simple or complex) and evaluating the quality of the user's intent in making the request (e.g., ambiguous, irrelevant to the data, toxic, etc.).

In some implementations, prompt engine 305 may instruct LLM 330 to generate multiple alternative suggestions and to filter or screen the suggestions according to a self-evaluation of each suggestion. In some implementations, LLM 330 may be tasked with providing all of the suggestions it has generated along with their respective self-evaluations, and prompt engine 305 makes a determination about which suggestions to include in the response based on the self-evaluations. In some scenarios, LLM 330 is tasked with generating an explanation in natural language format in the event that none of the suggestions are deemed suitable by LLM 330 for responding to the input. The explanation may include suggestions for additional information which, if included with the input in a new input, may be more successful in generating a suggestion.

Having configured a prompt, prompt engine 305 submits the prompt to LLM 330. LLM 330 generates a reply according to the prompt and sends the reply to prompt engine 305. Prompt engine 305 generates a response to the input based on the reply from LLM 330 and sends the reply to user interface 307 for display.

In user interface 307, application 301 receives an input from the user indicating a selection of a suggestion in the response. Based on the selection, prompt engine 305 sends instructions to various ones of application component 303 to implement the suggestion. For example, where the suggestion includes a calculated column, the instructions include adding a column at a location in the data table and entering the suggested formula in the column cells. Application 301 updates workbook data 320 to include the implementation of the suggestion and sends an update to the display to user interface 307.

In an alternative implementation of operational scenario 400, user interface 307 receives an input requesting a calculated column to be added to a data table of workbook data 320. The input may be a natural language input from the user received by user interface 307 or a selection of a suggestion displayed in user interface 307. Prompt engine 305 configures a prompt based on the input including context data from application 301 and sends the prompt to LLM 330. LLM 330 returns a reply to prompt engine 305, and prompt engine 305 configures a response to the input based on the reply. The response is presented to the user in user interface 307, where the user selects a suggestion in response.

Based on the selected suggestion, prompt engine 305 sends the formula of the selected suggestion to application 301 along with instructions to add a column to the data table and enter the formula in the cells of the newly added column. The instructions may also include adding a column header to the column, which may be provided by LLM 330 in its reply. Application 301 implements the instructions including updating workbook data 320 to include the new calculated column and updating the display of workbook data 320 in user interface 307. For example, the instruction to add a column and insert the suggested formula into the cells may be sent to a formatting component of application component(s) 303, while the instruction to compute the formula may be sent to a calculation engine of application component(s) 303. A In yet another implementation of operational scenario 400, user interface 307 receives a natural language input from the user or a selection of a suggested action displayed in user interface 307. Prompt engine 305 configures a prompt based on the input, including context data from application 301, and sends the prompt to LLM 330.

In an implementation, the prompt includes an instruction which tasks LLM 330 with generating multiple alternative suggestions in response to the input. The prompt also tasks LLM 330 with generating a self-evaluation of the suggestions and filtering the suggestions based on the self-evaluation. The self-evaluation can include evaluating the suggestions or suggested formulas on the basis of correctness, toxicity, relevance, and so on. Suggestions or suggested formulas which are deemed, for example, incorrect, toxic, or irrelevant are eliminated from the reply by LLM 330. LLM 330 returns a reply to prompt engine 305. Prompt engine 305 configures a response to the input based on the reply. The response is presented to the user in user interface 307, where the user selects a suggestion in response.

In an implementation, the prompt may also task LLM 330 with generating an explanation in the event that all of the suggestions or suggested formulas are filtered out of the reply. The explanation may include suggestions for additional information to be included in the input. Prompt engine 305 displays the explanation in user interface 307.

In yet another implementation of operational scenario 400, user interface 307 receives a natural language input from the user or a selection of a suggested action displayed in user interface 307. Prompt engine 305 configures a prompt based on the input, including context data from application 301, and sends the prompt to LLM 330. Prompt engine 305 configures a response to the input based on the reply. The response is presented to the user in user interface 307, where the user selects a suggestion in response.

In user interface 307, prompt engine 305 receives the selection of a suggestion in the response. Based on the selection, prompt engine 305 sends instructions to various ones of application component 303 to implement the suggestion. Application 301 implements the suggestion in workbook data 320 and sends an update to the display to user interface 307.

Subsequent to displaying an update to the display in user interface 307, the user provides additional natural language inputs to prompt engine 305 via user interface 307. The inputs may relate to the suggestion that was implemented, to another suggestion, to an error generated in relation to the implemented suggestion, or to another aspect of workbook data 320. The inputs trigger replies from LLM 330 and responses to the inputs based on the replies. With each new input, prompt engine 305 gathers context data from application 301 which includes the chat history, i.e., previous inputs, replies, suggestions, and so on. The series of inputs and responses result in a turn-based conversation. In some turns, the user may not select a suggestion but instead submit another natural language input.

It may be appreciated that the various implementations of operational 400 are not mutually exclusive and can be combined in different ways to describe a variety of operational scenarios.

FIGS. 5A-5G illustrate operational scenario 500 of an LLM integration with a spreadsheet environment and referring to elements of FIG. 3 in an implementation. In operational scenario 500 of FIG. 5A, a spreadsheet application, implemented on a computing device such as a laptop computer, displays user experience 501 including data table 502 and task pane 503.

Figure 5B:
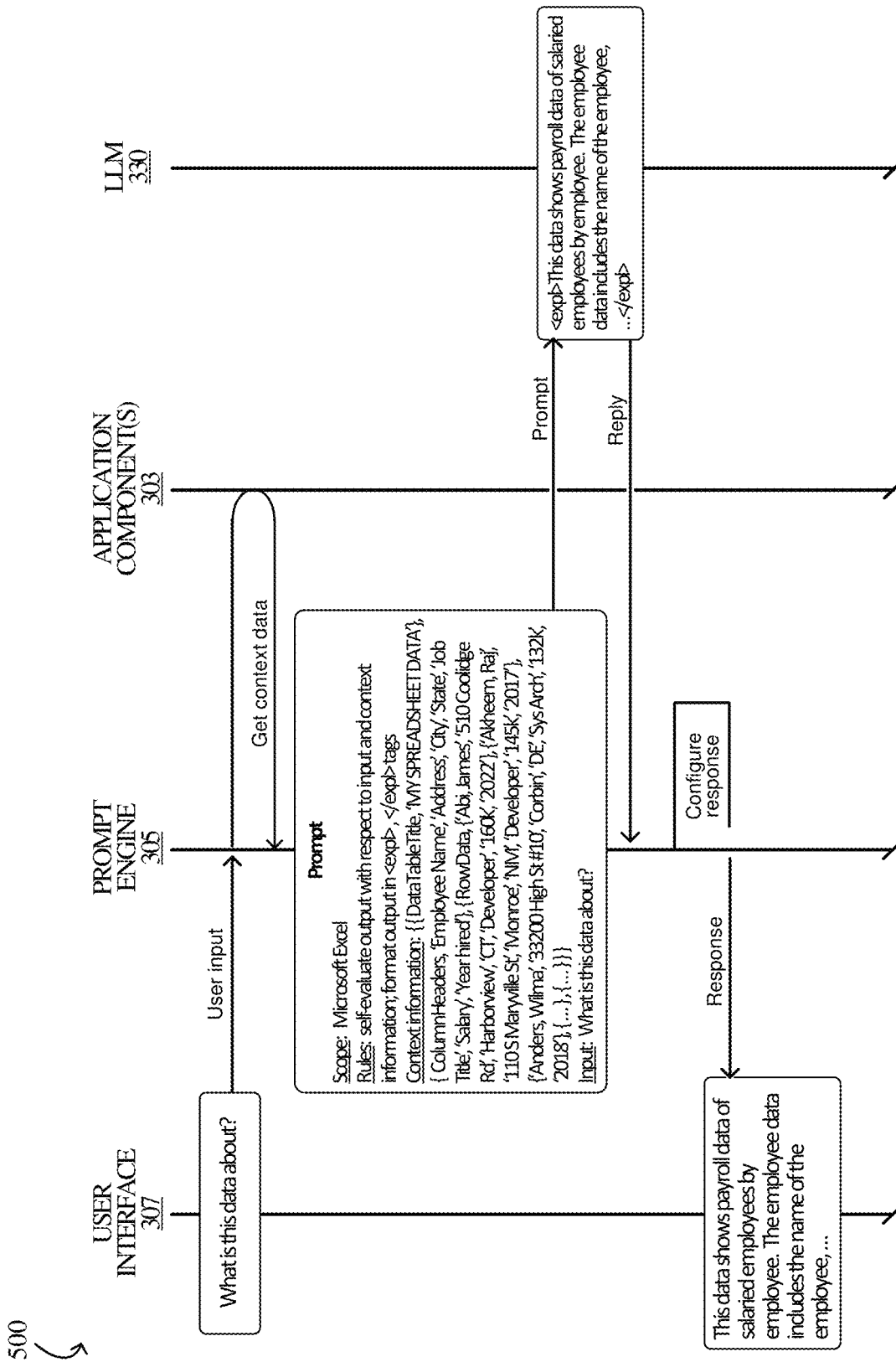

FIGS. 5B-5F continue operational scenario 500, illustrating a turn-based chat including inputs received from a user, prompts generated based on the inputs, and responses based on replies to the inputs from LLM 330. In FIG. 5B, the user enters the natural language inquiry about data table 502 into task pane 503. User interface 307 transmits the user input to prompt engine 305 which generates a prompt based on the input. Prompt engine 305 selects a prompt template based on a type or classification of the inquiry and configures a prompt according to the template. In the prompt, prompt engine 305 includes tasks, instructions, or rules applicable to generating a reply to the input, such as tasking LLM 330 to perform a self-evaluation of its reply and a rule to return the reply in a particular output format which is suitable for parsing. For example, for inputs involving generating an explanation, the prompt may specify the explanation is to be enclosed in tags <explanation> and </explanation>. The tasks, instructions, and rules included in the prompt may be predetermined according to the prompt template or according to the type or classification of the inquiry.

Prompt engine 305 also includes contextual information in the prompt. Prompt engine 305 retrieves spreadsheet context data relating to data table 502 from various ones of application components 303. For example, for a general inquiry about the contents of data table 502, prompt engine 305 configures the prompt to include all the column headers in data table 502 along with the table name and the first five rows of data. In adding the column headers and spreadsheet data to the prompt, prompt engine 305 may substitute expanded column headers in place of abbreviated column headers to avoid confusing or misleading LLM 330 with regard to the contents of the columns (e.g., substituting "Year hired" for "Yr hired") and store the substitutions to restore the original column headers in the response.

Continuing with FIG. 5B, with the prompt configured, prompt engine 305 sends the prompt to LLM 330. LLM 330 generates a reply to the prompt and transmits the reply to prompt engine 305. Prompt engine 305 processes the reply, including extracting the natural language explanation enclosed in the appropriate tags, and generates a response for display by user interface 307 in task pane 503.

Figure 5C:
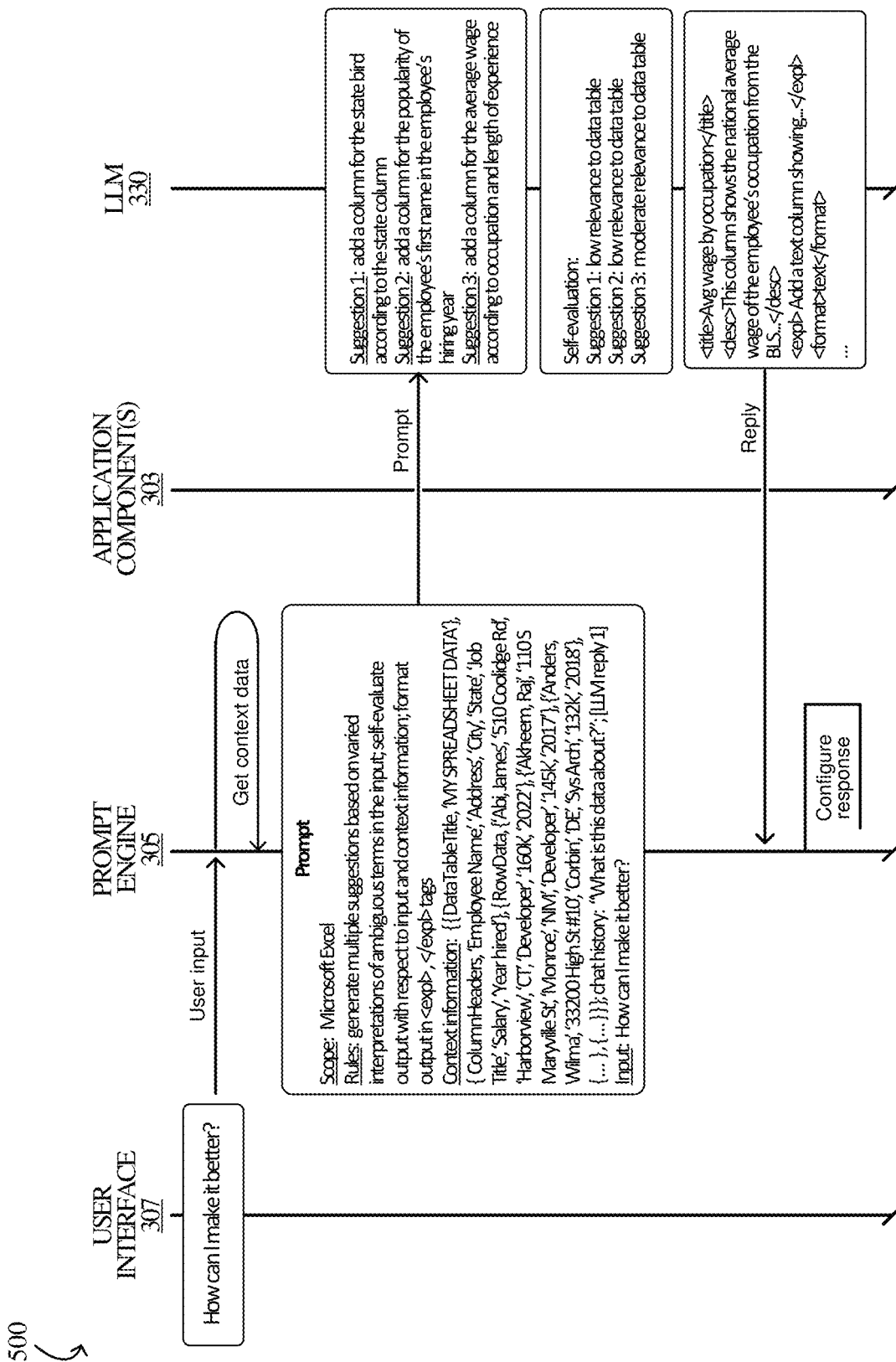

Next, in FIG. 5C, the user submits a second input in task pane 503 requesting suggestions for making "it" better. Prompt engine 305 selects a template to configure a prompt. For an ambiguous or underspecified input, the prompt template may include an instruction to LLM 330 to interpret the input in multiple ways and to generate multiple alternative suggestions based on the interpretations. Here, "it" may refer to, for example, the formatting of data table 502, the organization of data table 502, to the contents of data table 502, or to some other aspect of data table 502. Prompt engine 305 adds context information to the prompt: relevant spreadsheet data, such as the column headers and some rows of data, and the chat history thus far. The prompt also includes an instruction for LLM 330 to self-evaluate its suggestions and to filter out suggestions which are of less than moderate relevance to the subject of the inquiry. The tasks may also include a rule to generate, for any suggested formulas produced by LLM 330, a description and/or explanation of the formula enclosed in the appropriate tags.

Continuing operational scenario 500 in FIG. 5C, prompt engine 305 submits the prompt to LLM 330. Upon receiving the prompt, LLM 330 generates three suggestions, then performs a qualitative evaluation of each of the suggestions with respect to how well they respond to the inquiry in terms of accuracy, appropriateness, relevance, quality, toxicity, and so on. In this exemplary scenario, LLM 330 determines that two suggestions are of low relevance to data table 502. LLM 330 sends a reply including the third suggestion to prompt engine 305. The reply is formatted according to output formatting rules provided in the prompt.

Upon receiving LLM 330's reply, prompt engine 305 post-processes the reply to generate a response for display in user interface 307. Post-processing the reply includes extracting information from the reply according to the output formatting rules, such as a description of the suggestion and instructions by which the suggestion can be implemented either by application components 303 or by the user. Continuing to FIG. 5D, the response includes a link by which the user can view more detailed information about the suggestion and a graphical button by which to add the column to data table 502. The user clicks the "Add column" button, causing one or more of application components 303 to modify data table 502 to include the new column and to fill the column according to instructions provided in the reply. Application components 303 transmit an instruction to user interface 307 to update the display of data table 502 accordingly.

Figure 5D:
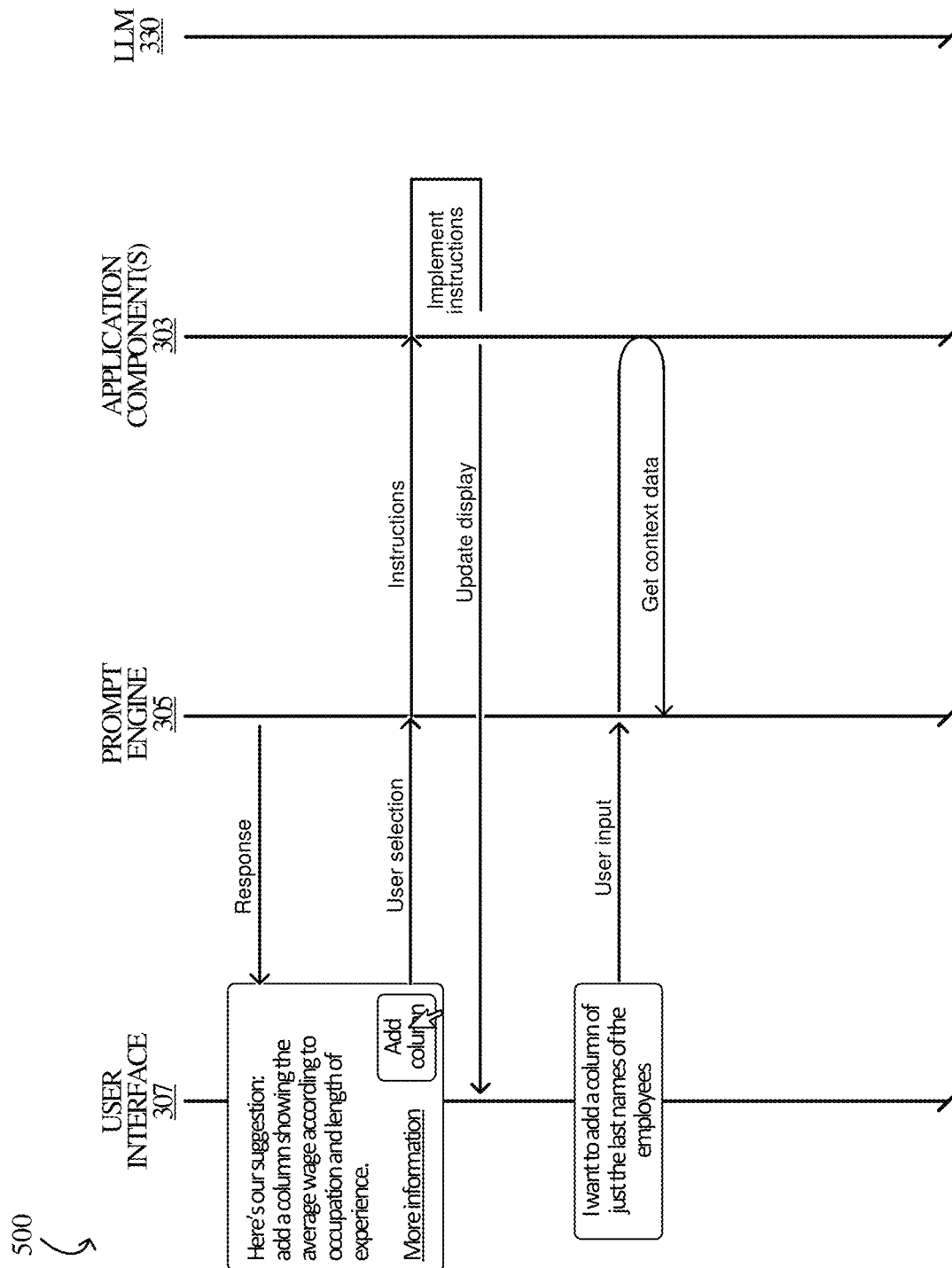
Figure 5E:
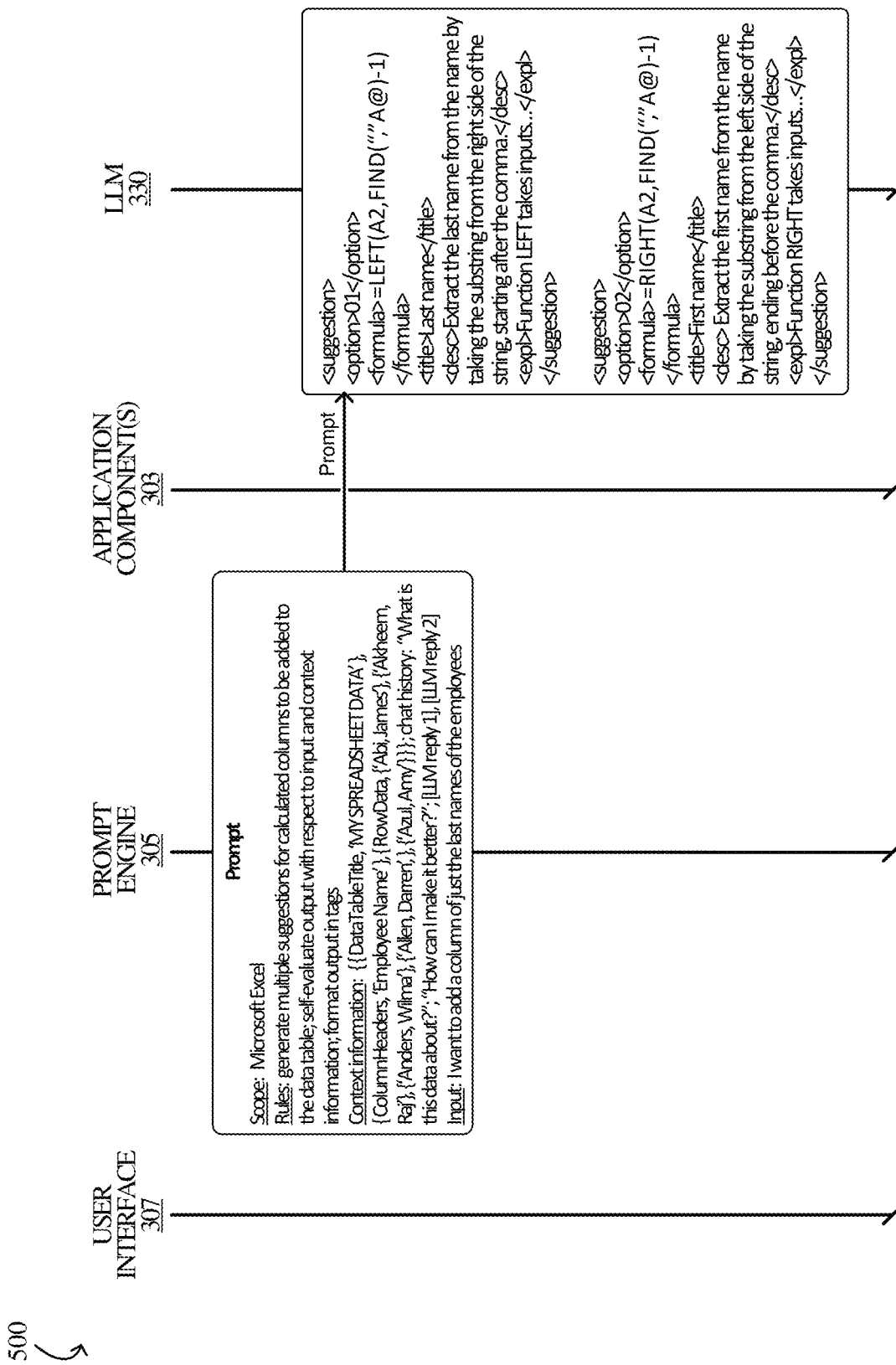

Next, in FIG. 5D, user interface 307 receives a third input from the user which requests to add a column which will include a specified type of data which is to be calculated or determined based on other data in data table 502. Continuing in FIG. 5E, prompt engine 305 configures a prompt for the request involving the addition of a calculated column which includes an instruction to LLM 330 to generate multiple alternative suggestions in response to the input and to evaluate the quality of each formula with respect to the input. Prompt engine 305 includes the relevant column and a portion or all of the data in the column in the prompt for context. Prompt engine 305 also includes the chat history that has accumulated thus far as additional contextual information for LLM 330.

Figure 5F:
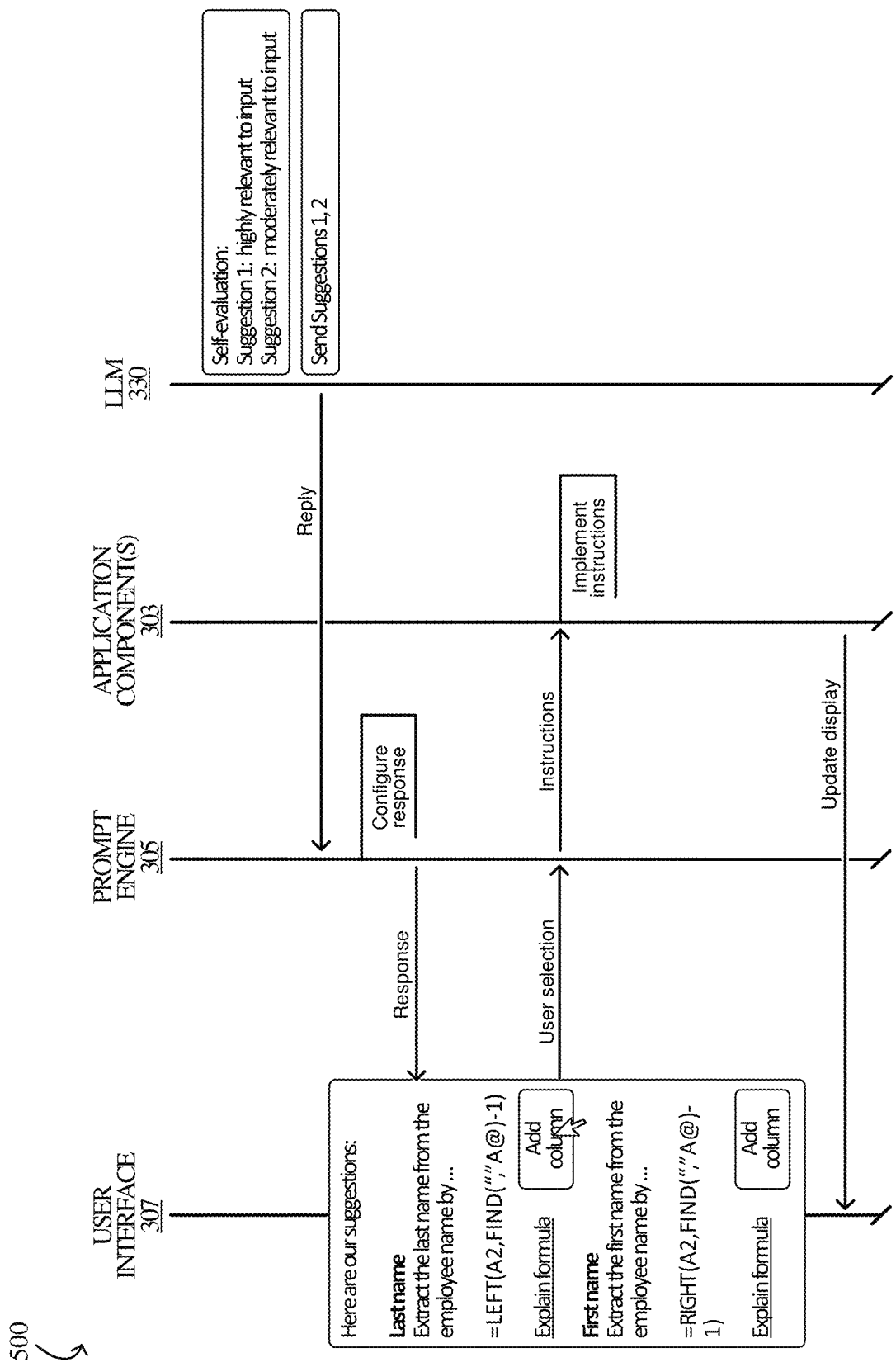

In response to the prompt, LLM 330 generates two formulas along with the descriptions and explanations and determines, in FIG. 5F, that the formulas are of moderate and high relevance to the input. LLM 330 transmits its reply to prompt engine 305 which, in turn, generates a response and sends the response to user interface 307 for display. Prompt engine 305 configures the response to display the suggestions or suggested formulas in order of relevance (highest to lowest). In some implementations, if the user hovers the cursor over a calculated column suggestion in the response, user interface 307 will display a preview of the column in data table 502. The user selects the first suggestion for implementation.

FIG. 5G illustrates data table 502 subsequent to the addition of the calculated column. In data table 502, two new columns have been added: average wage based on occupation including data provided by LLM 330 and last name calculated by a formula based on the Employee Name column. Task pane 503 displays chat history 505 that has accumulated thus far, and which may be submitted by prompt engine 305 for context in any subsequent requests.

Figure 6:
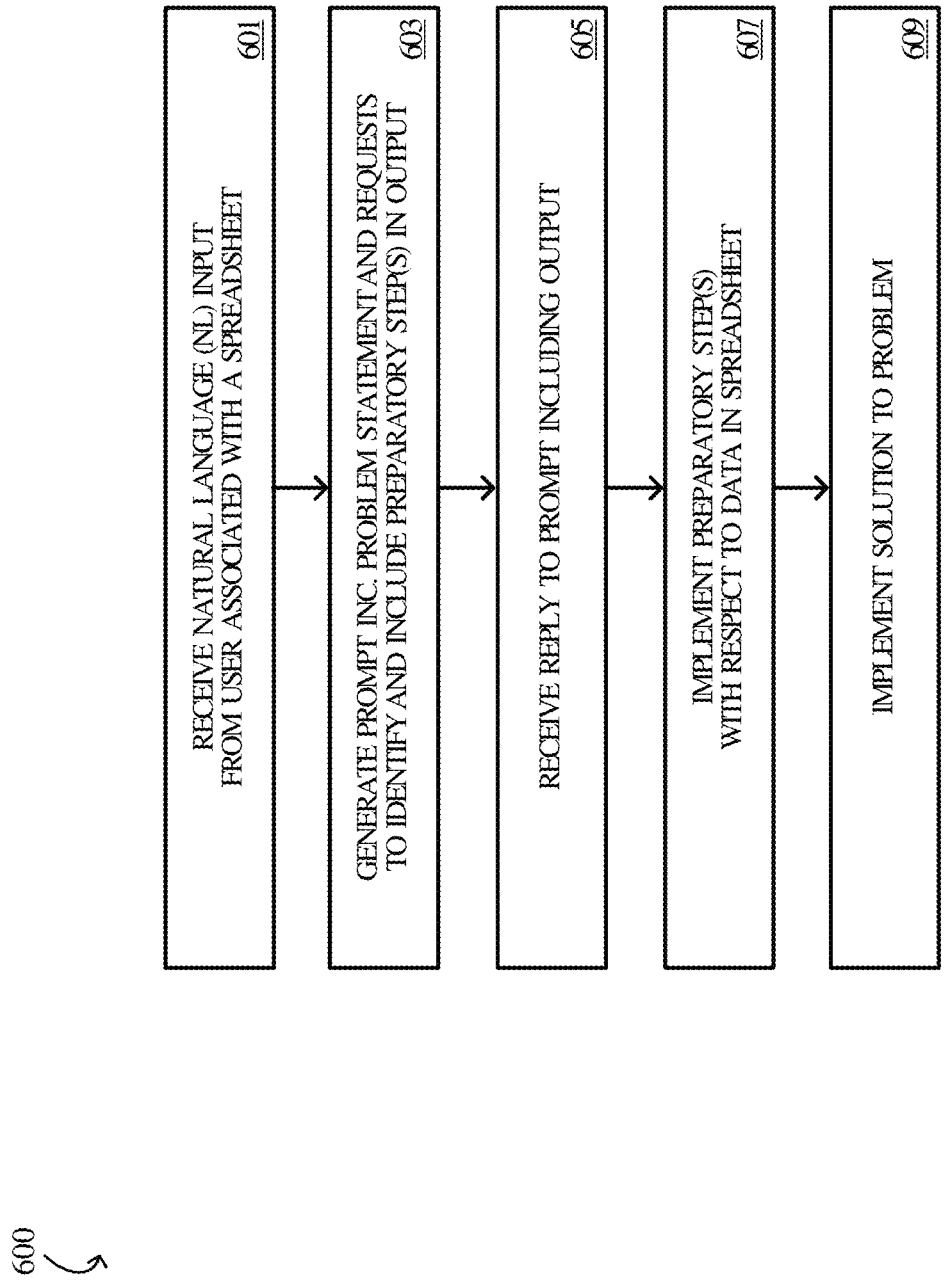
FIG. 6 illustrates a method of operating an application service in an implementation.

FIG. 6 illustrates a method of generating a prompt for an LLM integration with a spreadsheet environment in an implementation, referred to herein as process 600. Process 600 may be implemented in program instructions in the context of any of the software applications, modules, components, or other such elements of one or more computing devices. The program instructions direct the computing device(s) to operate as follows, referred to in the singular for the sake of clarity.

In process 600, an application service, of which application service 110 of FIG. 1 is representative, receives a natural language input from a user associated with a spreadsheet (step 601). In an implementation, the user enters a query into a chat interface displayed in the user experience of a spreadsheet environment of the productivity application, such as a spreadsheet application displaying a workbook or a word processing document including a spreadsheet data table. The user-supplied input may refer to a dataset, such as a data table, in a spreadsheet, or the input may reference a particular aspect of the spreadsheet. The intent of the user's request may be to improve the dataset by requesting suggestions for modifying the dataset, e.g., adding a calculated column. The natural language input includes a text-based input keyed into the chat interface by the user or spoken by the user and translated by a speech-to-text module.

The application service generates a prompt based on the natural language input and at least a portion of the spreadsheet and which includes a problem statement or task, a request for the LLM service to identify one or more preparatory steps to take before generating a solution to the problem or task, and a request to include the one or more preparatory steps in output that includes the solution (step 603). In an implementation, the prompt includes a portion of the spreadsheet to which the input refers which provides a context for a reply to the input from the LLM service. For example, the prompt may include column headers and a subset of the data which are representative of the entire spreadsheet or which are relevant to the request. The solution may be one or more suggested formulas or calculated columns to be added to the dataset.

In an implementation, the preparatory steps include cleaning the dataset of erroneous, malformed, duplicative, or incomplete data prior to implementing a solution to avoid erroneous output or generating error messages in the spreadsheet environment. To clean the dataset, the prompt instructs the LLM service to generate assumptions about the data and to test the predicates against the portion of data in the prompt. The assumptions may relate to the range of possible, actual, or realistic values of the data, the data type, the format of the data, and so on. For example, for a column of ordinal values or integer-type identifier values, a negative number would be erroneous. So, too, might be cells with symbols or alphabetic characters. In some scenarios, duplicate rows should be removed from the dataset.

In its instructions, the prompt charges the LLM service with generating predicates based on the assumptions and determining how to handle data values which violate the predicates. Handling violative data can include modifying or replacing values in the data set or deleting rows of data, such as when the row lacks sufficient information to be of use in the solution. The prompt may also direct the LLM service to exclude functions relating to generating error messages.

The application service receives a reply to the prompt from the LLM service including the preparatory steps and solution to the problem (step 605). In an implementation, the application service configures a response to the user's input, based on the reply, for display in the user experience of the spreadsheet environment. For example, where the prompt instructs the LLM service to organize its reply to allow the application service to extract the solution (e.g., a suggested formula or calculated column) and the preparatory steps (i.e., steps taken to prepare or clean the data prior to implement the solution).

Upon receiving the reply from the LLM service, the application service implements the one or more preparatory steps on the spreadsheet data (step 607). In an implementation, the application service may present a description of the preparatory steps to the user and implement those steps when the user provides an indication in the user interface to do so. For example, the application service may present a response in a chat interface or task pane of the user experience which includes a hyperlink to remove duplicative rows of data. In some scenarios, the application service may present a graphical button by which the data will be sorted according to the preparatory steps received in the reply. When the user clicks the hyperlink, the application service performs the associated step. In some implementations, the application service may implement the preparatory steps automatically.

Once the data has been cleaned or otherwise prepared according to the preparatory steps, the application service implements the solution (step 609). The solution may include entering a suggested formula or calculated column in the dataset.

FIG. 7 illustrates workflow 700 for generating a solution with preparatory steps as directed to an LLM service by an application service in an implementation. In step 701 of workflow 700, the LLM service receives the prompt generated by the application service which includes the task or problem statement based on the user's input, a portion or representative sample of the data from the spreadsheet data, and instructions relating to generating and providing preparatory steps performed prior to implementing the solution. Upon receiving the prompt, the LLM service generates a list of assumptions about the spreadsheet data based on the sample data in the prompt. The predicates may relate to the data range, data type, data format, and meaning or significance of the data which may be inferred by the LLM based on an examination of the set of values and/or on column headers. The assumptions determined by the LLM service are such that the solution will be generated based on the assumptions being true for the spreadsheet data.

The prompt further directs the LLM service to generate predicates for validating the spreadsheet data, that is, to determine if the data must be cleaned or otherwise prepared for implementation of the solution (step 705). The predicates include functions which generate Boolean (True/False) output with respect to an assumption. For example, the predicates may test for uniqueness, for quantitative values, for numerical values, for integer values, for nonzero values, and so on.

The LLM service also generates a cleaning function by which to clean or prepare the spreadsheet data for the solution (step 707). In an implementation, the output from the LLM includes spreadsheet commands or functions which modify, reformat, rewrite, or delete data values to make the associated predicate true.

With the preparatory steps determined, the LLM service returns a reply to the application service which includes the preparatory steps and the solution to be implemented on the spreadsheet data (step 709). In an implementation, the preparatory steps include the assumptions generated by the LLM service, the predicates generated based on or corresponding to the assumptions, and cleansing functions or operations associated with the predicates.

FIG. 7 also includes workflow 710 by which the application service implements the output from the LLM service based on the prompt. In an implementation, the application service implements the preparatory steps and the solution in the spreadsheet environment (step 711). The application service validates the spreadsheet data (from which the sample data was drawn) against each of the predicates provided in the reply (step 713). If/when a predicate returns a "false" value, the application service implements the clean function provided in the reply to clean or prepare the data for the solution (step 715). With the data cleansed, the application service implements the solution (step 717).

In some implementations, the prompt directs the LLM service to integrate the preparatory steps as part of the solution. Thus, predicate testing and cleansing steps are performed each time the solution is invoked rather than as precursor steps prior to invoking the solution. When the solution is invoked, the application service performs any preparatory steps and processes the data table according to the solution. By directing the LLM service to include preparatory steps as part of generating the solution, the user may be presented with the ability to generate the desired outcome in a single step. In addition, by including data validation and/or preparation as part of the solution process, the data table remains in its original form until the solution is invoked.

In an implementation, various ones of the steps of workflow 710 are presented to the user in the spreadsheet environment, such as in a task pane or chat interface. The user is presented with links or graphical buttons by which to step through workflow 710. For example, the application service may test the spreadsheet data against the predicates and, upon detecting a false response from a predicate, present the user with the option to clean or prepare the data with the clean function or with a particular cleaning function or operation associated with the violated predicate. The user is further presented with the option to implement the solution (e.g., suggested formula or calculated column).

FIG. 8 illustrates operational scenario 800 for configuring a prompt for an LLM service integration with a spreadsheet environment. In operational scenario 800, a user submits input requesting a calculated column for the sales commission for each transaction in the sales data of spreadsheet 801, where (for example) the commission is 4% of the order total plus a bonus of $200 for orders over $2500. The application service associated with the spreadsheet application generates a prompt based on the input which includes sample data from spreadsheet 801 (e.g., the column headers and first six rows of data) along with instructions to the LLM service to generate and provide preparatory steps for preparing the data for the solution.

The application service receives a reply to the prompt from the LLM service including steps to prepare the data for generating a suggested column. The application service implements the preparatory steps on spreadsheet data 801 to generate cleansed data 803. In this exemplary scenario, the preparatory steps determined by the LLM include removing duplicative rows of data (e.g., row 14 duplicates row 8 in spreadsheet data 801), removing data rows with incomplete data (e.g., row 12 of spreadsheet data 801 lacking a valid client identifier), and replacing missing or invalid transaction number data with "001" (e.g., rows 3, 6, and 7 of spreadsheet data 801).

Having prepared the data according to the preparatory steps provided in the reply, the application service adds to the dataset a calculated column for computing the sales commission for each transaction as illustrated in spreadsheet 805. In an implementation, the reply includes a suggested formula for calculating the commission based on the user's input, and the application service displays the suggested formula in a task pane and a preview of the column in the spreadsheet environment.

FIGS. 9A-9E illustrate operational scenario 900 of an LLM integration with a spreadsheet environment in an implementation. In operational scenario 900, the application displays spreadsheet 901 in a user interface of a client application executing on the user's computing device, such as a laptop computer. In the user interface, the user can view and edit spreadsheet 901 and interact with the application to modify the spreadsheet, such as sending inquiries relating to spreadsheet 901. Spreadsheet 901 contains a data table including column headers and multiple rows of data.

Figure 9B:
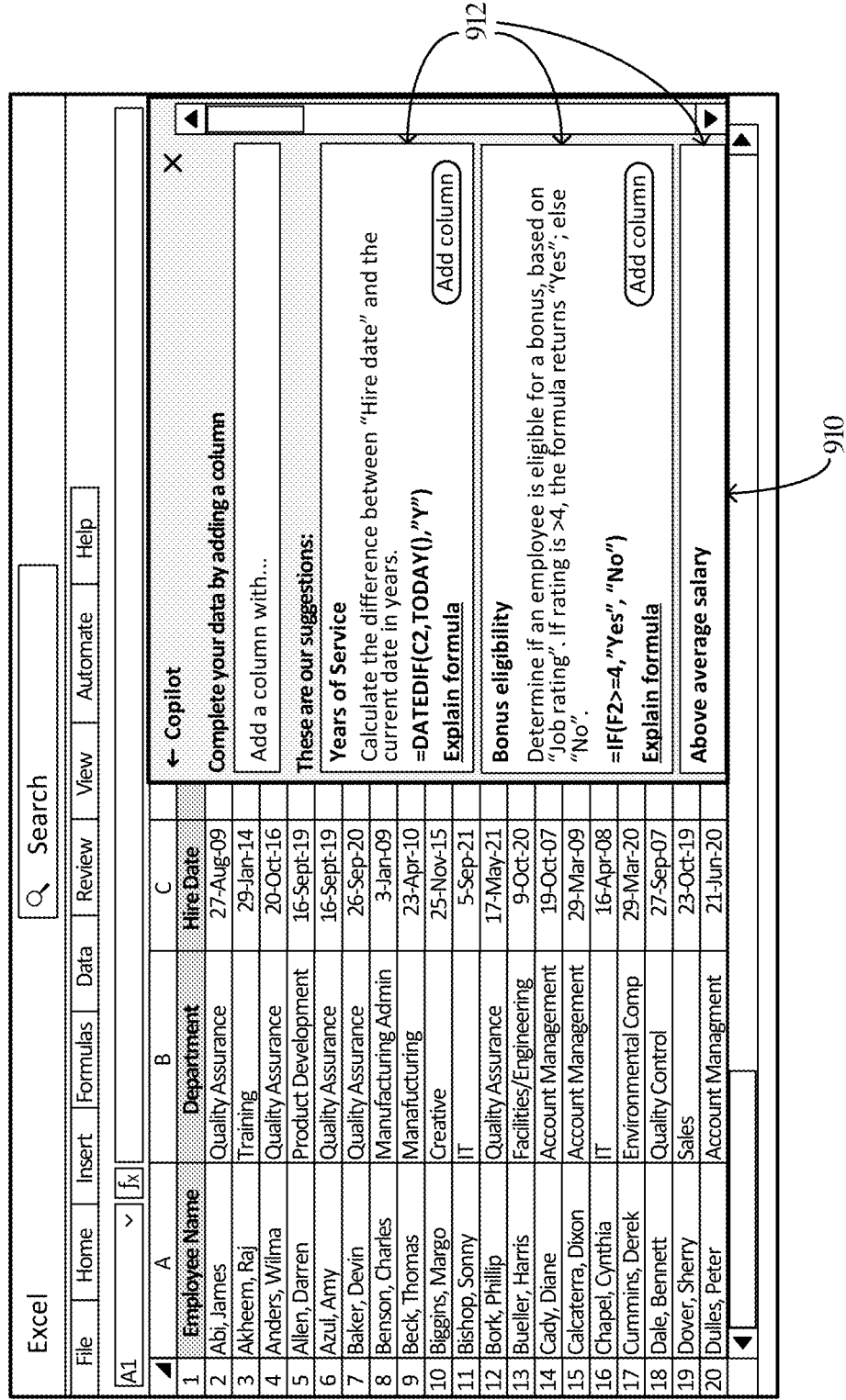

In FIG. 9A, the user selects a cell next to the last column of the data table. The application floats a suggestion to allow the application to create a column for the user. The user clicks on the suggestion which causes the client application to send a user input to the application indicating that the user is requesting suggestions for columns to be added to the data table in the spreadsheet. In an alternative scenario, the user may enter input in task pane 910 (illustrated in FIG. 9B) requesting a column be added for a quantity of interest to the user.

Upon receiving the user input, the application configures a prompt and sends the prompt to the LLM. The LLM replies with multiple suggestions, with each suggestion including a formula for a calculated column, formatting information, a description of the formula, and an explanation of the formula. The suggestions sent to the application were screened by the LLM for correctness, appropriateness, utility, and other characteristics before being sent. The application receives the suggestions in a parse-able format by which the application generates and displays one or more responses to the user input.

Having received a reply to the prompt from the LLM, the application displays task pane 910 in the user interface, as illustrated in FIG. 9B. Task pane 910 displays cards 912, each presenting a response to the user input based on the spreadsheet context—the column headers in the data table and several rows of data. For each card of cards 912, the application displays a suggested column title and a brief description of the formula along with the formula. The application includes a link in each card ("Explain formula") by the selection of which the user can view an explanation of the formula, such as how the formula works and what the inputs to the formula represent. The application also includes a graphical button by which the user can implement the suggestion by having the application add the calculated column to the spreadsheet.

Figure 9C:
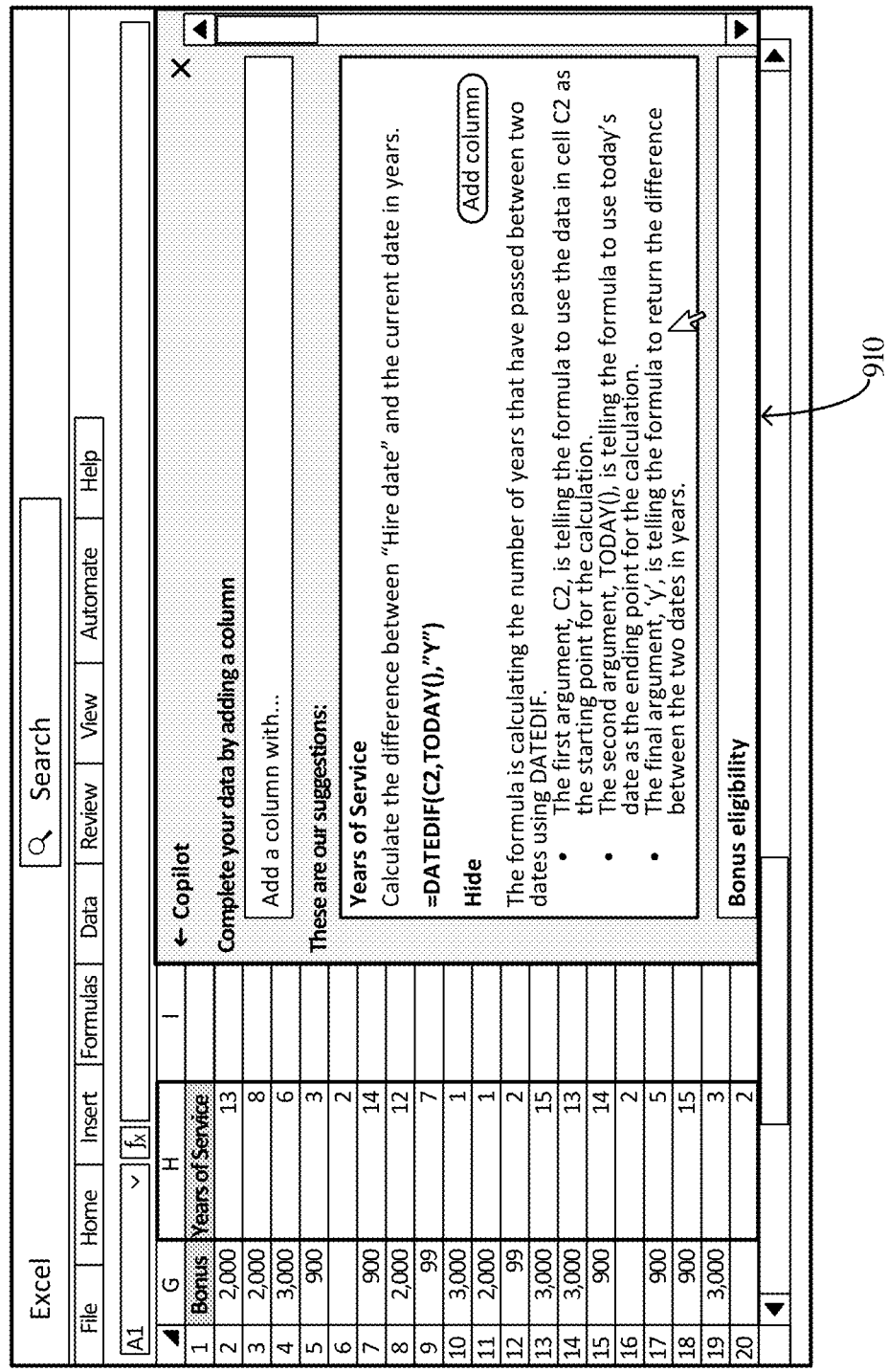

FIG. 9C illustrates a scenario where the user causes his/her cursor to hover a card in task pane 910 in an implementation. When the cursor hovers over a card, the application displays a preview of the calculated column associated with the card in the data table. As shown in FIG. 9C, the user hovers over the "Years of service" card, and the application displays a preview of the Years of Service column in the data table.

Figure 9D:
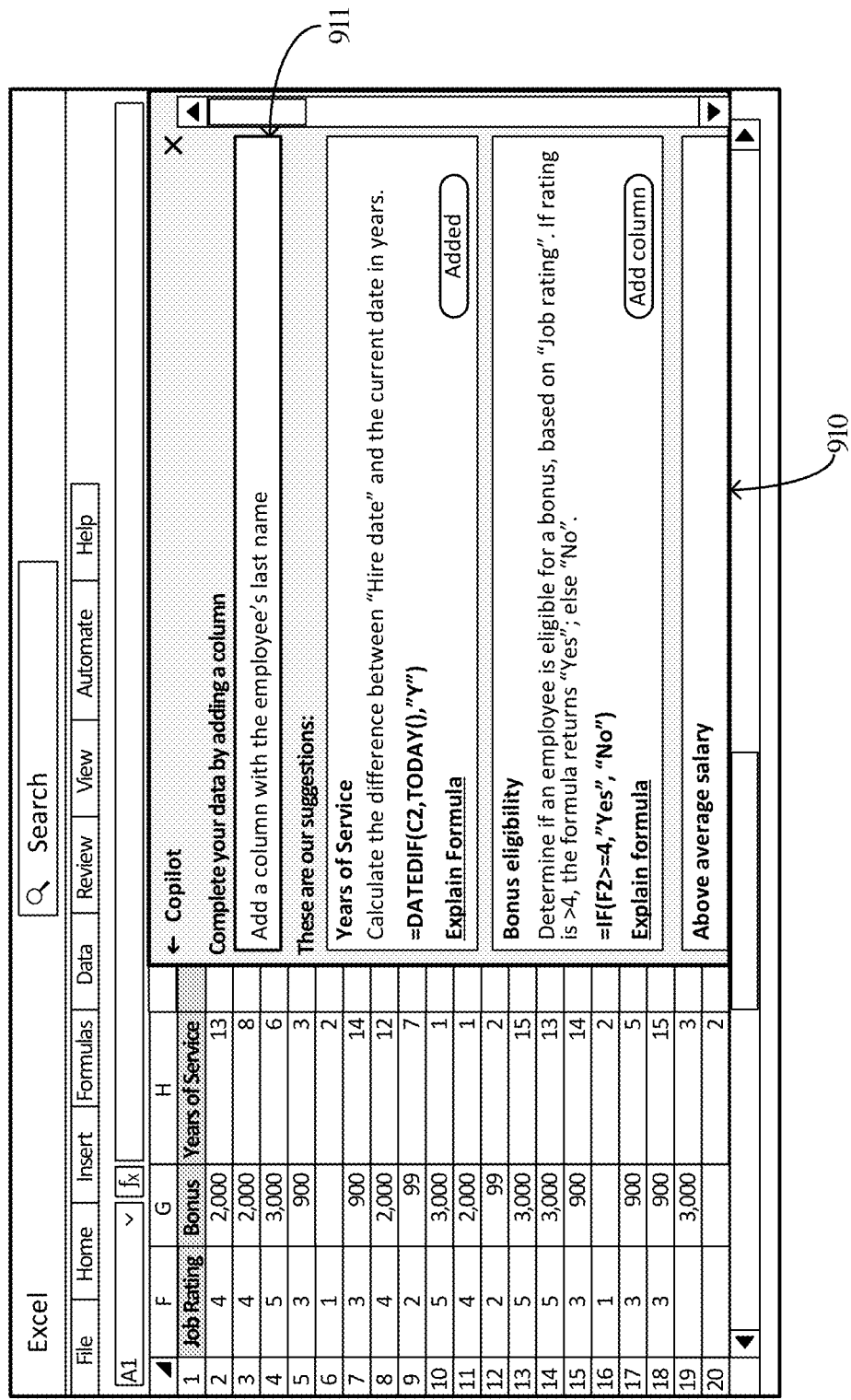
Figure 9E:
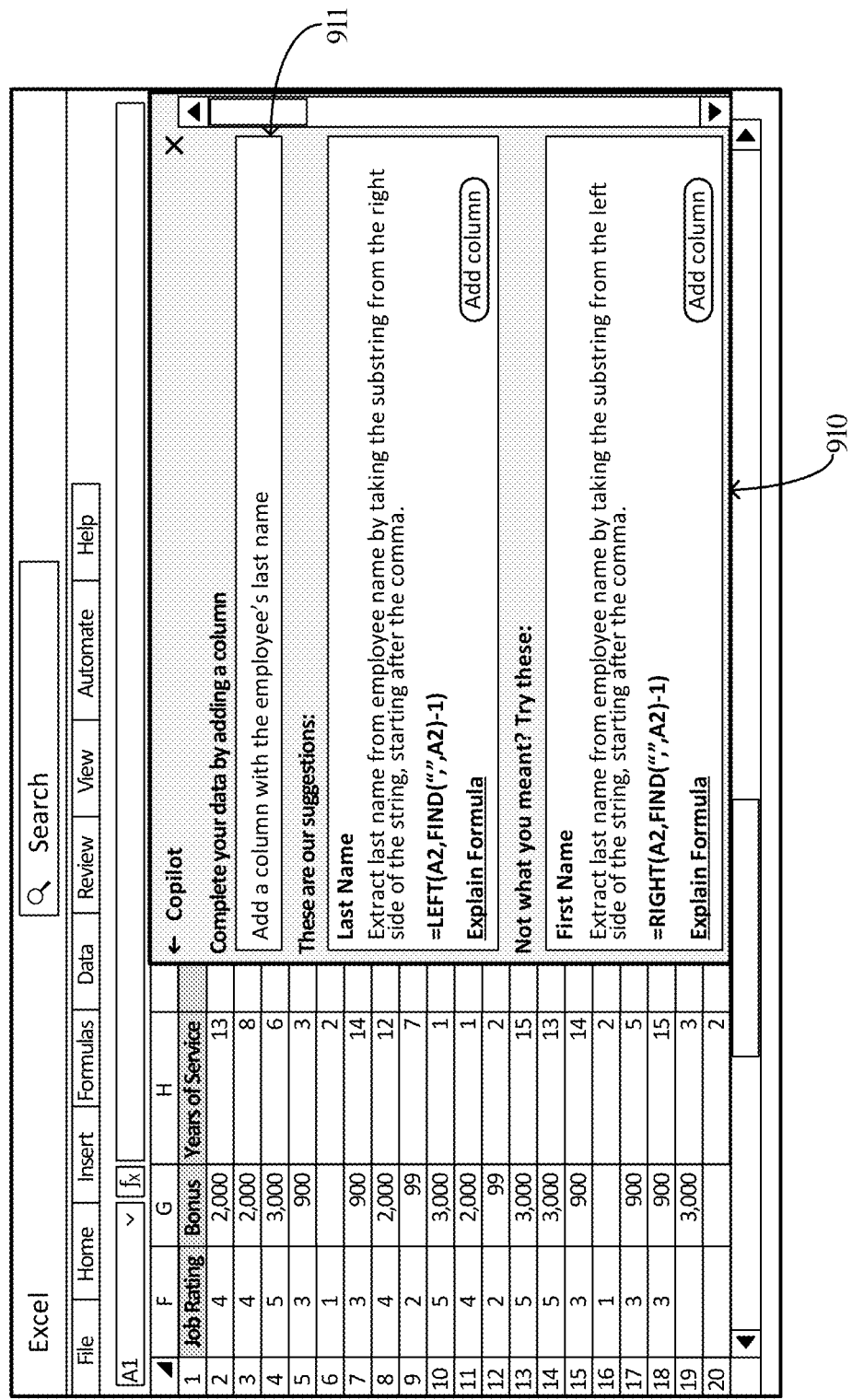

FIG. 9D illustrates task pane 910 subsequent to the user selecting the Years of Service column for inclusion in the data table. In textbox 911, the user enters a natural language input to "Add a column with the employee's last name." The application configures a prompt based on the input which tasks the LLM to produce suggestions in response to the input. The LLM returns to the application multiple suggestions, each including a formula for a calculated column, formatting information, a description of the formula, and an explanation of the formula. The application parses the suggestions to generate cards for display in task pane 910. Notably, the suggestion deemed most relevant to the input by the LLM in evaluating its own responses is listed first.

Figure 10A:
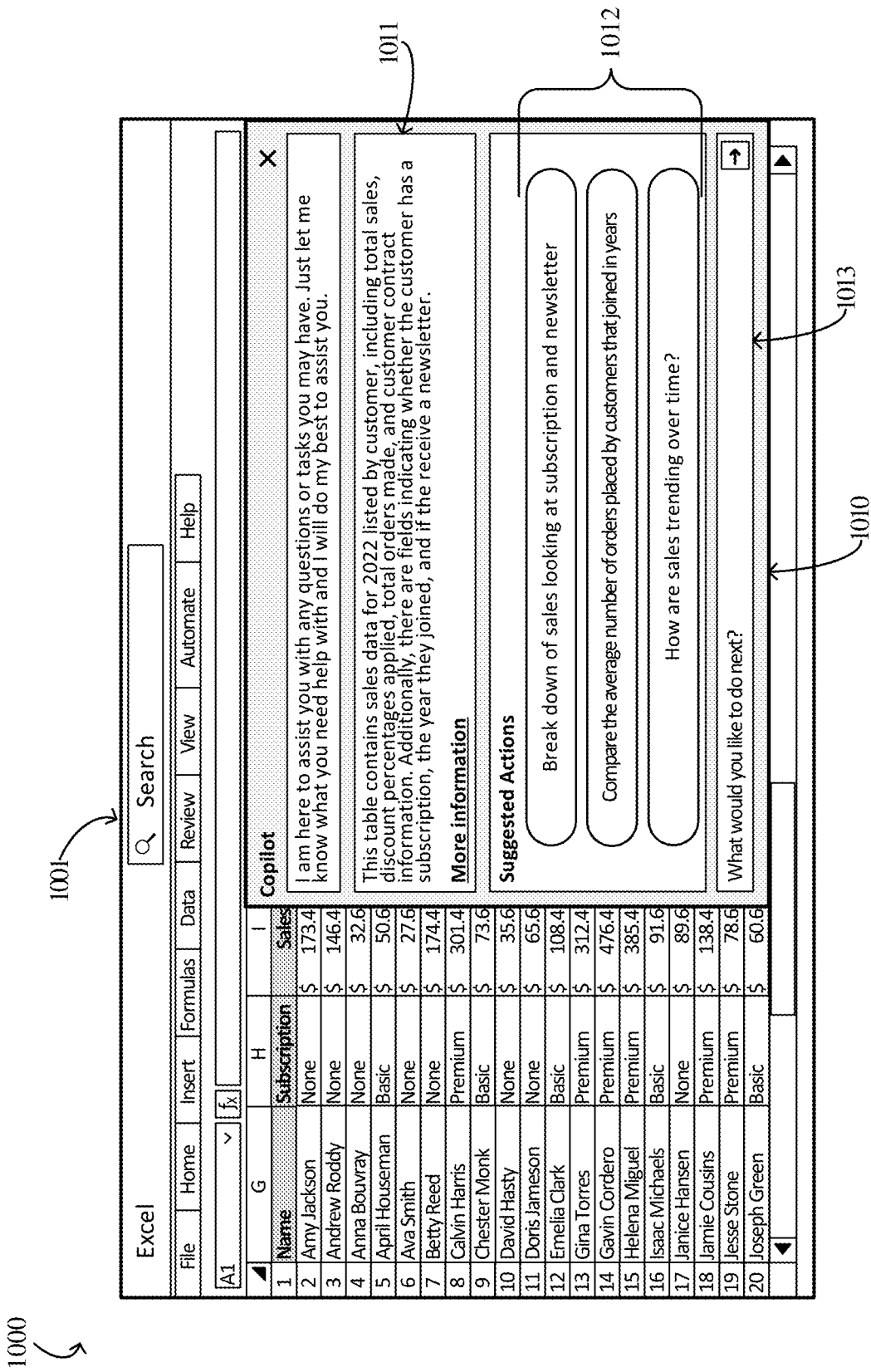
FIGS. 10A-10C illustrate an exemplary operational scenario for an LLM integration in a spreadsheet environment in an implementation.
Figure 10B:
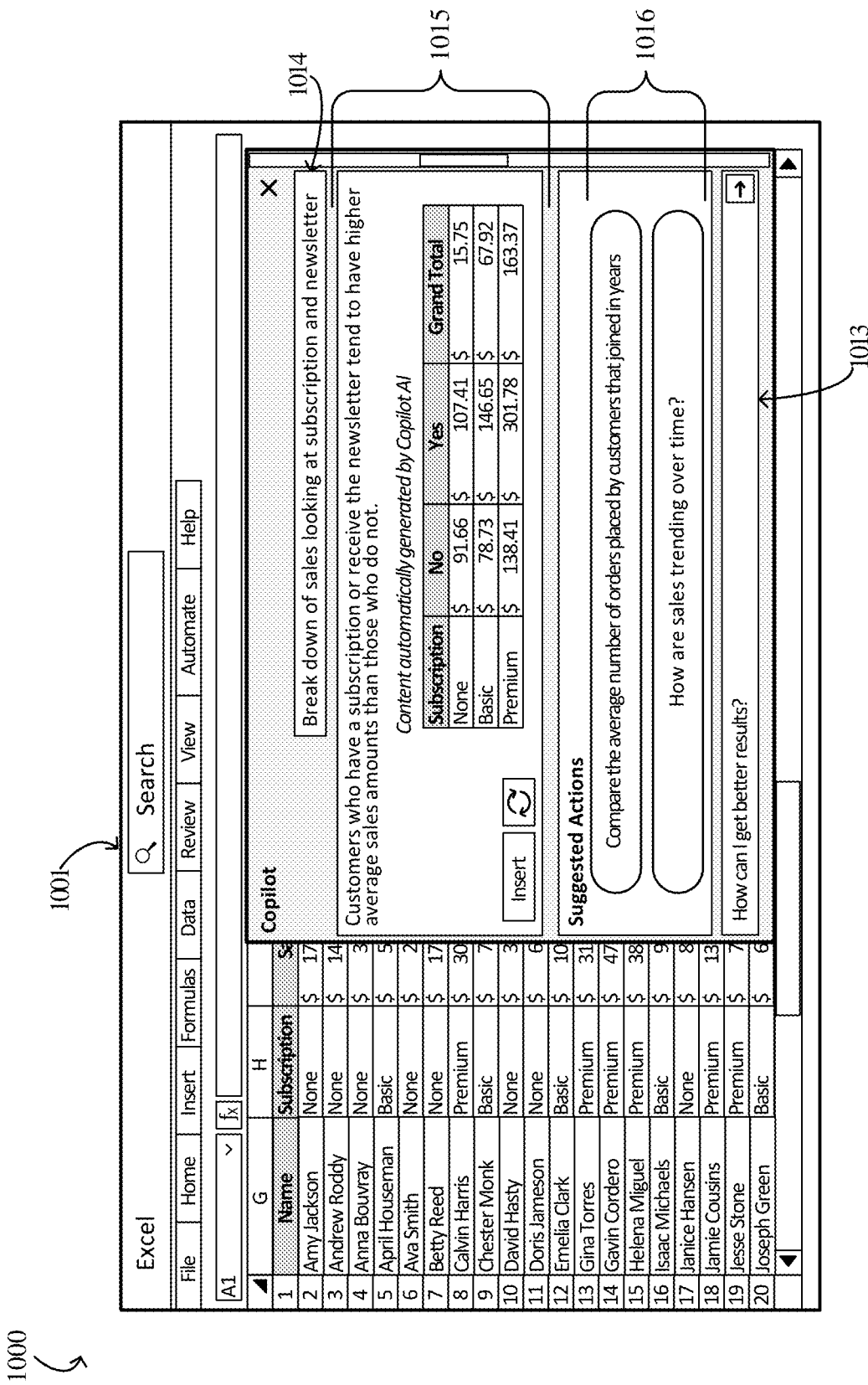
Figure 10C:
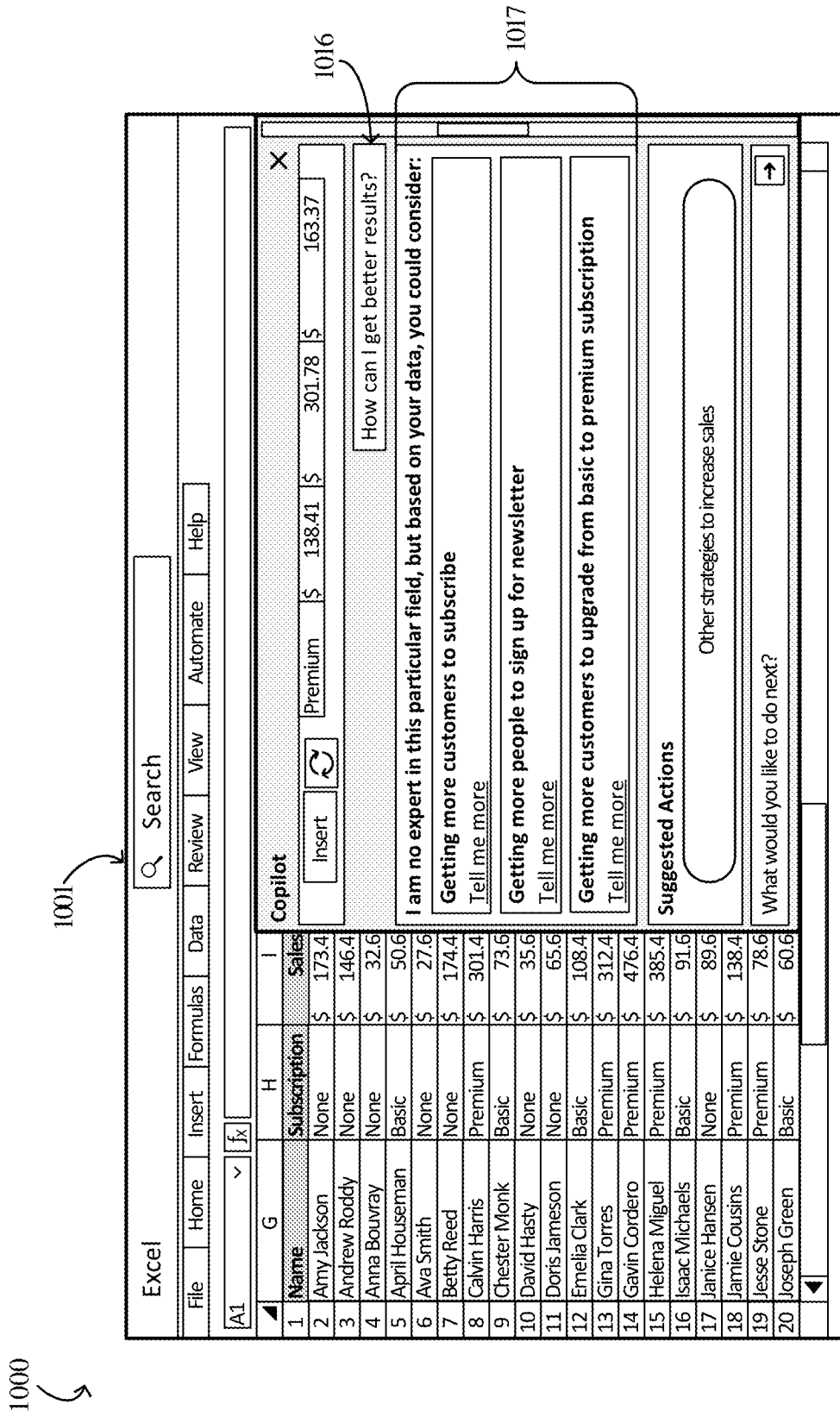

FIGS. 10A, 10B, and 10C illustrate operational scenario 1000 of an LLM integration with a spreadsheet environment in an implementation. In operational scenario 1000 of FIG. 10A, the application displays spreadsheet 1001 in a user interface of a client application executing on the user's computing device, such as a laptop computer. In the user interface, the user can view and edit spreadsheet 1001 and interact with the application to modify the spreadsheet, such as sending inquiries relating to spreadsheet 1001. Spreadsheet 1001 contains a data table including column headers and multiple rows of data.

Upon receiving a user selection to open the task pane in the user interface, the application displays task pane 1010 including a chat interface by which the application receives natural language input from the user. The application sends a prompt including spreadsheet contextual data to the LLM to generate a description of the spreadsheet and/or the data table. The application receives a reply from the LLM which the application processes for display, resulting in output 1011 in task pane 1010. The application also receives three suggested actions from the LLM which relate to modifying spreadsheet 1001 which the application processes and displays in output 1012. The user is also presented with textbox 1013 by which the user can submit natural language inputs, such as requests or queries, to the LLM via the application. When the user submits an input in textbox 1013, the application receives and processes the input to generate a prompt based on the input which is submitted to the LLM. In generating the prompt, the application may include prompt parameters such as a scope of the output and formatting rules for the output to control or direct the how the LLM can or should reply to the prompt. The prompt may also include a request to provide a self-evaluation of the reply or of suggestions in the reply by which the application determines whether or how to display the reply or the suggestions in the reply to the user in task pane 1010.

Continuing with operational scenario 1000 in FIG. 10B, the user input has become part of the chat history (see textbox 1014), and the user has selected one of the suggested actions of output 1012 ("Break down of sales looking at subscription and newsletter"). The application receives the selection and configures a prompt based on the selection for submission to the LLM. The LLM generates and sends a reply to the prompt to the application which the application processes to produce a response to the input. The response to the input from the application based on the reply from the LLM is shown in output 1015. Output 1015 includes an explanation of the reply and a table demonstrating a spreadsheet calculation, including spreadsheet formulas, demonstrating a calculation responsive to the input. The application adds graphical buttons by which the user can interact with output 1015, such as inserting the table in output 1015 into the worksheet or workbook of spreadsheet 1001 or recalculating the output 1015 table if/when the user modifies a value in it. The user, in response to output 1015, can select another of the suggested actions presented in output 1017 or submit another input in textbox 1013. Continuing the exemplary scenario, the user submits a natural language input in textbox 1013, "How can I get better results?"

Based on the input received from the user in textbox 1013, the application generates a prompt for submission to the LLM. The prompt includes the input or the substance of the input, along with contextual information such as the chat history and spreadsheet contextual data (e.g., column headers and the first five rows of data). In FIG. 10C, task pane 1010 is updated by the application to show input 1016 and output 1017 based on the LLM's reply to the prompt based on input 1016. Output 1017 includes three suggestions received from the LLM in response to input 1016 according to parameters provided by the application in the prompt. The application configures a display of the suggestions according to the self-evaluation provided by the LLM for each suggestion, with the suggestion corresponding to the highest level of confidence, quality, or accuracy presented first. The application includes in output 1017 graphical buttons ("Tell me more") by which the user can request more information about each suggestion.

Figure 11:
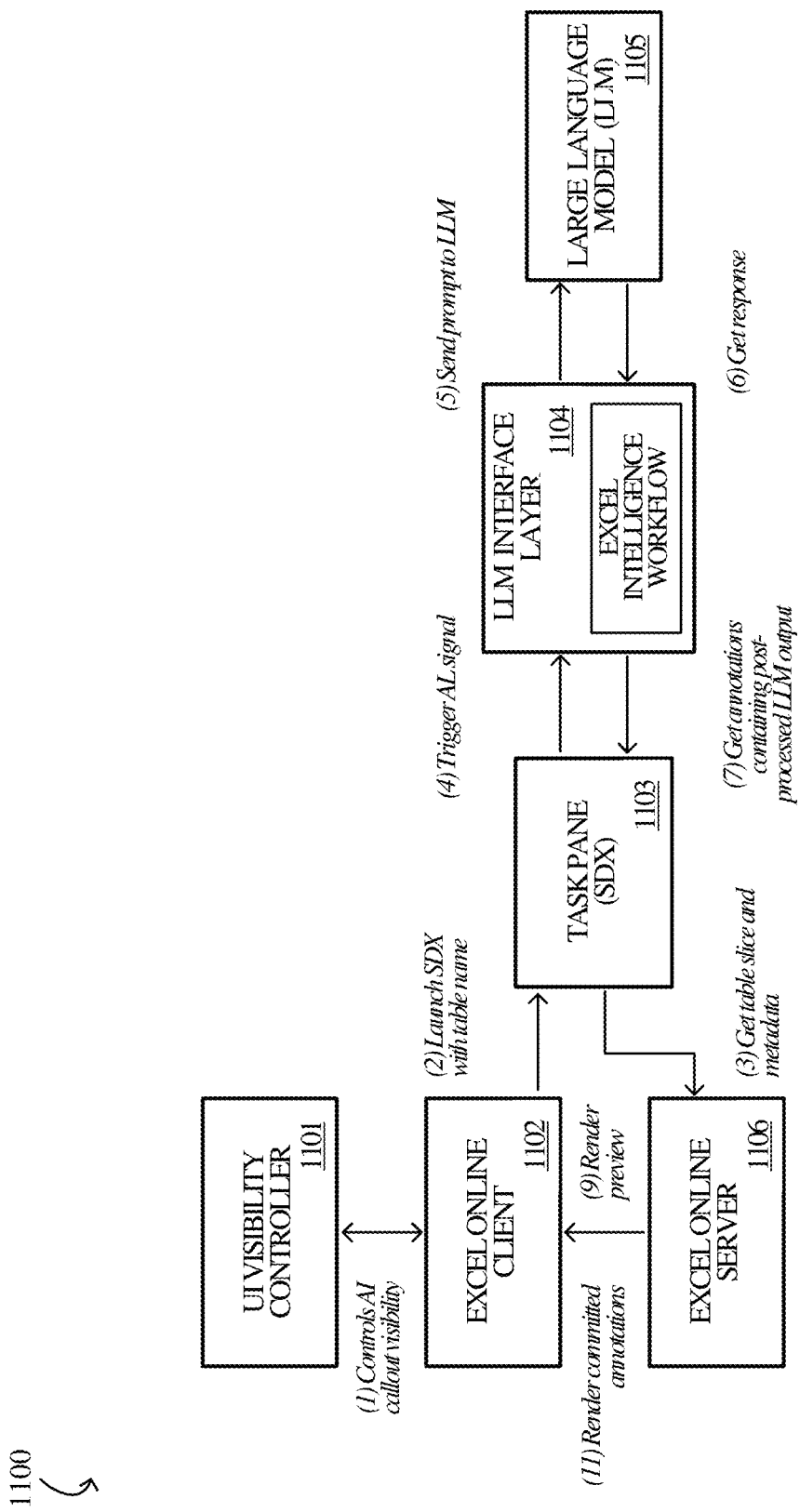
FIG. 11 illustrates an operational architecture for an LLM integration in a spreadsheet environment in an implementation.

Turning now to FIG. 11, FIG. 11 illustrates distributed software architecture 1100 showing the components of a Microsoft Excel application including Excel application server 1106, Excel client application 1102, and UI visibility controller 1101 in an implementation. Software architecture 1100 illustrates a process by which an Excel application responds to a natural language input from a user based on a reply to the input from an LLM.

Excel client application 1102 executing on a user computing device in association with Excel application server 1106. Excel client application 1102 displays a user interface including task pane 1103. Task pane engine 1103 manages turn-based conversations with LLM 1105 about data in a table in the user interface. Task pane engine 1103 gets table slice data (e.g., spreadsheet contextual data and/or portions of the spreadsheet data) and spreadsheet metadata from Excel application server 1106.

Excel client application 1102 receives natural language input from a user and sends the input to task pane engine 1103. Task pane engine 1103 receives the natural language input from Excel client application 1102 and sends the input to LLM interface layer 1104, discussed in more detail in FIG. 12. LLM interface layer 1104 operates Excel intelligence workflow and communicates with LLM 1105.

LLM interface layer 1104 sends a prompt based on the natural language input to LLM 1105. LLM 1105 generates a reply to the prompt and transmits the reply to LLM interface layer 1104. LLM interface layer 1104 generates a response to the input based on the reply received from LLM 1105 including post-processed output from LLM 1105. LLM interface layer 1104 sends the response to task pane engine 1103 for configuring a display of the response. Task pane engine 1103 writes the configured response to the spreadsheet file and sends the configured response to Excel application server 1106 which renders and displays the response and previews in Excel client application 1102.

Figure 12:
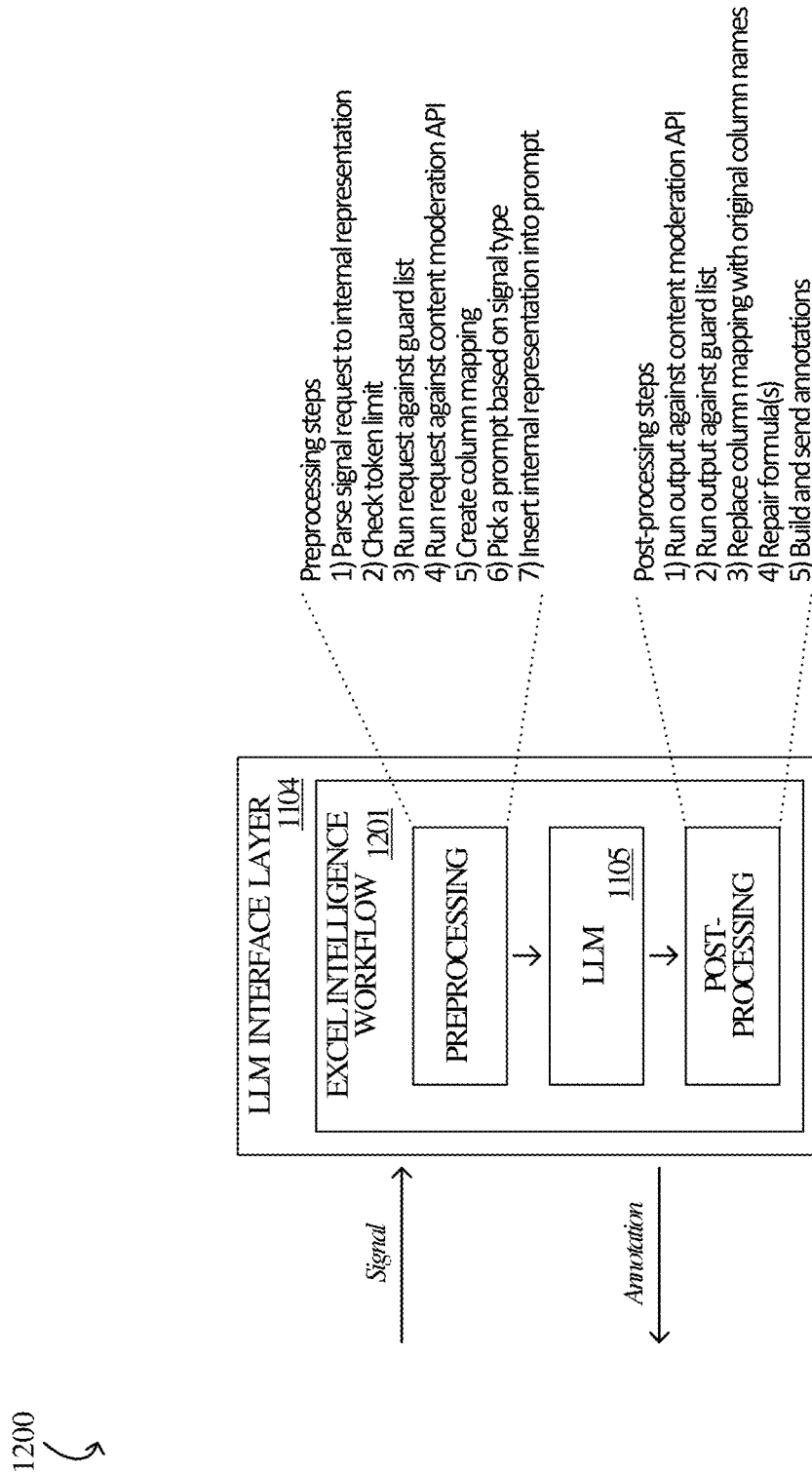
FIG. 12 illustrates an operational architecture for an LLM integration in a spreadsheet environment in an implementation.

FIG. 12 illustrates operational architecture 1200 of LLM interface layer 304 of FIG. 3 in an implementation. In operational architecture 1200, LLM interface layer 1104 receives an input from Excel client application 1102. LLM interface layer 1104 implements Excel intelligence workflow 1201 which includes preprocessing of the input to generate a prompt for LLM 1105 and postprocessing of the reply from LLM 1105 according to which task pane engine 1103 configures a display of the response to the input.

In an implementation, to preprocess the user input, LLM interface layer 1104 parses the input to generate an internal representation. LLM interface layer 1104 performs other steps, including evaluating the input against a content moderation engine via an API and creating a column mapping by which substitute column headers are created and mapped to original column headers to replace the original column headers in the prompt to LLM 1105. Preprocessing also includes selecting a prompt or prompt format based on the type of input received and inserting the internal representation of the input into the prompt. The prompt generated based on preprocessing the input is submitted to LLM 1105.

LLM interface layer 1104 receives the reply from LLM 1105 based on the prompt and post-processes the reply. To post-process the reply, LLM interface layer 1104 performs several steps on the reply including evaluating the reply against a content moderation module via an API and replacing the substitute column headers with the original column headers according to the column mapping generated during preprocessing. LLM interface layer 1104 also evaluates formulas produced by LLM 1105 in its reply and repairs the formulas, such as correcting references to nonexistent spreadsheet columns or incorrect formula names or formula input formatting. LLM interface layer 1104 then builds the response to the input based on the reply and sends the response to task panel engine 1103. For example, the reply from LLM 1105 may be configured according to an output format rule in the prompt which instructs LLM 1105 to enclose parts of the reply in semantic tags.

FIG. 13 illustrates computing device 1301 that is representative of any system or collection of systems in which the various processes, programs, services, and scenarios disclosed herein may be implemented. Examples of computing device 1301 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 1301 may be implemented as a single apparatus, system, or device or may be implemented in a distributed manner as multiple apparatuses, systems, or devices. Computing device 1301 includes, but is not limited to, processing system 1302, storage system 1303, software 1305, communication interface system 1307, and user interface system 1309 (optional). Processing system 1302 is operatively coupled with storage system 1303, communication interface system 1307, and user interface system 1309.

Processing system 1302 loads and executes software 1305 from storage system 1303. Software 1305 includes and implements application service process 1306, which is (are) representative of the application service processes discussed with respect to the preceding Figures, such as processes 200 and 600. When executed by processing system 1302, software 1305 directs processing system 1302 to operate as described herein for at least the various processes, operational scenarios, and sequences discussed in the foregoing implementations. Computing device 1301 may optionally include additional devices, features, or functionality not discussed for purposes of brevity.

Referring still to FIG. 13, processing system 1302 may comprise a micro-processor and other circuitry that retrieves and executes software 1305 from storage system 1303. Processing system 1302 may be implemented within a single processing device but may also be distributed across multiple processing devices or sub-systems that cooperate in executing program instructions. Examples of processing system 1302 include general purpose central processing units, graphical processing units, application specific processors, and logic devices, as well as any other type of processing device, combinations, or variations thereof.

Storage system 1303 may comprise any computer readable storage media readable by processing system 1302 and capable of storing software 1305. Storage system 1303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1303 may also include computer readable communication media over which at least some of software 1305 may be communicated internally or externally. Storage system 1303 may be implemented as a single storage device but may also be implemented across multiple storage devices or sub-systems co-located or distributed relative to each other. Storage system 1303 may comprise additional elements, such as a controller, capable of communicating with processing system 1302 or possibly other systems.

Software 1305 (including application service process 1306) may be implemented in program instructions and among other functions may, when executed by processing system 1302, direct processing system 1302 to operate as described with respect to the various operational scenarios, sequences, and processes illustrated herein. For example, software 1305 may include program instructions for implementing an application service process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 1305 may include additional processes, programs, or components, such as operating system software, virtualization software, or other application software. Software 1305 may also comprise firmware or some other form of machine-readable processing instructions executable by processing system 1302.

In general, software 1305 may, when loaded into processing system 1302 and executed, transform a suitable apparatus, system, or device (of which computing device 1301 is representative) overall from a general-purpose computing system into a special-purpose computing system customized to support an application service in an optimized manner. Indeed, encoding software 1305 on storage system 1303 may transform the physical structure of storage system 1303. The specific transformation of the physical structure may depend on various factors in different implementations of this description. Examples of such factors may include, but are not limited to, the technology used to implement the storage media of storage system 1303 and whether the computer-storage media are characterized as primary or secondary storage, as well as other factors.

For example, if the computer readable storage media are implemented as semiconductor-based memory, software 1305 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1307 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 1301 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
    one or more computer-readable storage media;
    one or more processors operatively coupled with the one or more computer-readable storage media; and
    an application comprising program instructions stored on the one or more computer-readable storage media that, when executed by the one or more processors, direct the computing apparatus to at least:
        receive, via a user interface of the application, natural language input associated with a user of a spreadsheet;
        generate a prompt based on the natural language input and a portion of the spreadsheet, wherein the prompt includes a statement of a problem, a request for a large language model (LLM) service to identify one or more preparatory steps before generating a solution to the problem, and a second request to include the one or more preparatory steps in output that includes the solution to the problem;
        receive a reply to the prompt that includes the output, wherein the output comprises a spreadsheet formula and the one or more preparatory steps, wherein the one or more preparatory steps include evaluating spreadsheet data for data that violates a predicate, and modifying the data using a cleaning function associated with the predicate;
        display, in the user interface, a graphical input device to accept the spreadsheet formula;
        receive, via the user interface, a selection of the graphical input device to accept the spreadsheet formula;
        implement the one or more preparatory steps with respect to the spreadsheet data, including by evaluating the spreadsheet data for the data that violates the predicate, and executing the cleaning function to modify the data to satisfy the predicate; and
        recalculate the spreadsheet data according to the spreadsheet formula.

2. The computing apparatus of claim 1, wherein the predicate evaluates a format of the spreadsheet data identified by the LLM service based on the portion of the spreadsheet.

3. The computing apparatus of claim 2, wherein the predicate comprises a Boolean operator.

4. The computing apparatus of claim 1, wherein the one or more preparatory steps include generating assumptions about the data and testing the assumptions.

5. The computing apparatus of claim 4, wherein the one or more preparatory steps include generating predicates for testing the data based on the assumptions.

6. The computing apparatus of claim 5, wherein the one or more preparatory steps further include generating a cleaning function comprising operations performed on the data, wherein the operations are associated with the predicates.

7. The computing apparatus of claim 1, wherein the program instructions further direct the computing apparatus to display, in the user interface of the application, the solution to the problem.

8. The computing apparatus of claim 7, wherein the program instructions further direct the computing apparatus to receive user input indicative of a command to implement the solution to the problem with respect to the data in the spreadsheet.

9. A method comprising:
    receiving, via a user interface of an application, natural language input associated with a user of a spreadsheet;
    generating a prompt based on the natural language input and a portion of the spreadsheet, wherein the prompt includes a statement of a problem, a request for a large language model (LLM) service to identify one or more preparatory steps before generating a solution to the problem, and a second request to include the one or more preparatory steps in output that includes the solution to the problem;
    receiving a reply to the prompt that includes the output, wherein the output comprises a spreadsheet formula and the one or more preparatory steps, wherein the one or more preparatory steps include evaluating spreadsheet data for data that violates a predicate, and modifying the data using a cleaning function associated with the predicate;
    displaying, in the user interface, a graphical input device to accept the spreadsheet formula;
    receiving, via the user interface, a selection of the graphical input device to accept the spreadsheet formula;
    implementing the one or more preparatory steps with respect to the spreadsheet data in the spreadsheet, including by evaluating the spreadsheet data for the data that violates the predicate, and executing the cleaning function to modify the data to satisfy the predicate; and recalculating the spreadsheet data according to the spreadsheet formula.

10. The method of claim 9, wherein the predicate evaluates a format of the spreadsheet data identified by the LLM service based on the portion of the spreadsheet data.

11. The method of claim 10, wherein the predicate comprises a Boolean operator.

12. The method of claim 9, wherein the one or more preparatory steps include generating assumptions about the data and testing the assumptions.

13. The method of claim 12, wherein the one or more preparatory steps include generating predicates for testing the data based on the assumptions.

14. The method of claim 13, wherein the one or more preparatory steps further include generating a cleaning function comprising operations performed on the data, wherein the operations are associated with the predicates.

15. One or more computer readable storage media having program instructions stored thereon that, when executed by one or more processors operatively coupled with the one or more computer-readable storage media, direct a computing device to:

receive, via a user interface of an application, natural language input associated with a user of a spreadsheet;

generate a prompt based on the natural language input and a portion of the spreadsheet, wherein the prompt includes a statement of a problem, a request for a large language model (LLM) service to identify one or more preparatory steps before generating a solution to the problem, and a second request to include the one or more preparatory steps in output that includes the solution to the problem;

receive a reply to the prompt that includes the output, wherein the output comprises a spreadsheet formula and the one or more preparatory steps, wherein the one or more preparatory steps include evaluating spreadsheet data for data that violates a predicate, and modifying the data using a cleaning function associated with the predicate;

display, in the user interface, a graphical input device to accept the spreadsheet formula;

receive, via the user interface, a selection of the graphical input device to accept the spreadsheet formula;

implement the one or more preparatory steps with respect to the spreadsheet data, including by evaluating the spreadsheet data for the data that violates the predicate, and executing the cleaning function to modify the data to satisfy the predicate; and recalculate the spreadsheet data according to the spreadsheet formula.

16. The one or more computer readable storage media of claim 15, wherein the predicate evaluates a format of the spreadsheet data identified by the LLM service based on the portion of the spreadsheet data.

17. The one or more computer readable storage media of claim 16, wherein the predicate comprises a Boolean operator.

18. The one or more computer readable storage media of claim 15, wherein the one or more preparatory steps include generating assumptions about the data and testing the assumptions.

19. The one or more computer readable storage media of claim 18, wherein the one or more preparatory steps include generating predicates for testing the data based on the assumptions.

20. The one or more computer readable storage media of claim 19, wherein the one or more preparatory steps further include generating a cleaning function comprising operations performed on the data, wherein the operations are associated with the predicates.

\* \* \* \* \*